(12) United States Patent
Koshikawa et al.

(10) Patent No.: US 6,181,531 B1
(45) Date of Patent: *Jan. 30, 2001

(54) THIN FILM MAGNETIC HEAD SLIDER AND ELECTROSTATIC ACTUATOR FOR DRIVING A HEAD ELEMENT THEREOF

(75) Inventors: Takao Koshikawa; Hiroshi Maeda; Takahiro Imamura, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/189,301

(22) Filed: Nov. 10, 1998

Related U.S. Application Data

(62) Division of application No. 08/603,257, filed on Feb. 20, 1996, now Pat. No. 5,920,978.

(30) Foreign Application Priority Data

Mar. 1, 1995 (JP) .................................... 7-041574
Sep. 14, 1995 (JP) .................................... 7-236910

(51) Int. Cl.[7] .................................... G11B 21/20
(52) U.S. Cl. .................................... 360/294.4
(58) Field of Search .................................... 360/109, 103, 360/104, 294.4

(56) References Cited

PUBLICATIONS

Fan et al, Magnetic Recording Head Positioning at Very High Track Densities Using a Microactuator–Based Two–Stage Servo System, IEEE Transactions on Industrial, vol. 42, No. 3, Jun. 1995.*

Tang et al, Silicon Micromachined Electromagnetic Microactuators for Rigid Disk Drives, IEEE Transactions on Magnetics, vol. 31, No. 6, Nov. 1995.*

* cited by examiner

*Primary Examiner*—David Davis
(74) *Attorney, Agent, or Firm*—Greer, Burns & Crain, Ltd.

(57) ABSTRACT

A thin film magnetic head slider has a media opposing surface which is adapted to be opposed to a recording medium, and includes a sacrificial layer, on a substratum that has a surface for forming the media opposing surface having at least one rail. A tracking mechanism or loading/unloading mechanism can be provided on the slider. An electrostatic actuator suitable for driving such a mechanism includes a stationary section having a plurality of teeth parallel to each other, a movable section having a plurality of teeth parallel to the teeth of the stationary section, a support spring for supporting the movable section so that the movable section can be moved with respect to the stationary section in the tooth width direction. A drive force generator moves the movable section to a position at which an electrostatic attraction force in the tooth width direction generated when a voltage is impresses between the teeth of the stationary section and those of the movable section, is balanced with the elastic force of the head suspension.

28 Claims, 27 Drawing Sheets

AIR BEARING SURFACE

AIR BEARING SURFACE

AIR BEARING SURFACE

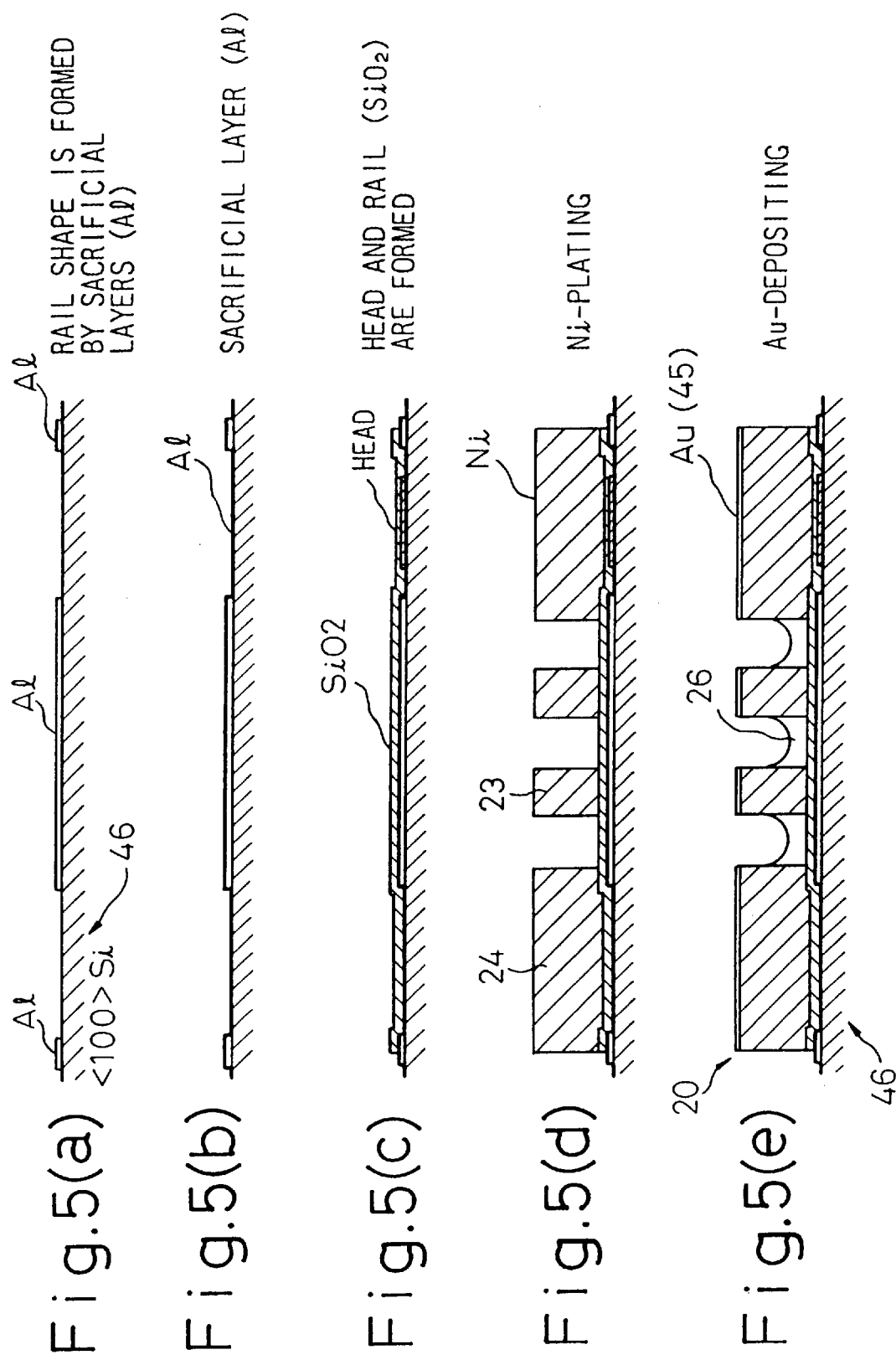

(AIR BEARING SURFACE)

(AIR BEARING SURFACE)

(AIR BEARING SURFACE)

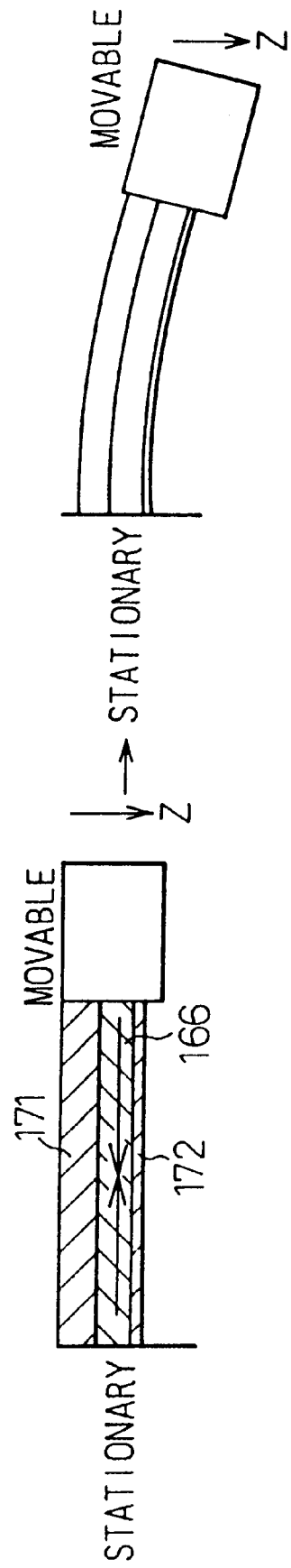
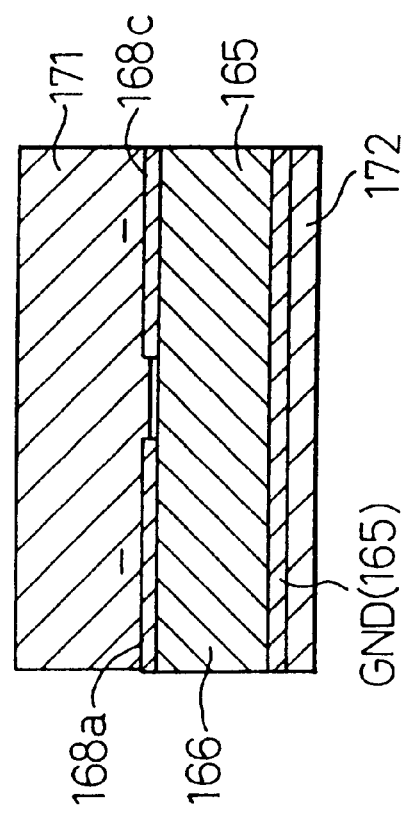
Fig.31(a)
Fig.31(b)

THIN FILM MAGNETIC HEAD SLIDER AND ELECTROSTATIC ACTUATOR FOR DRIVING A HEAD ELEMENT THEREOF

This is a divisional, of application Ser. No. 08/603,257, filed Feb. 20, 1996 now U.S. Pat. No. 5,920,978.

BACKGROUND OF THE INVENTION

1. Field of the Invention

The present invention relates to a thin film magnetic head slider used for a magnetic disk unit, a manufacturing method therefor and an electrostatic actuator for driving a head element thereof.

2. Description of the Related Art

In recent years, the magnetic disk unit has been made compact, its performance has been highly enhanced, and its cost has been reduced. In accordance with the recent tendency, it is desired to develop a thin film magnetic head of high performance and low cost. In order to meet the demand, a horizontal magnetic head (planar magnetic head) is proposed, in which a thin film pattern surface is arranged in parallel with an air bearing surface. The reason is described as follows. In the case of a horizontal magnetic head, it is easy to form floating rails having specific shapes. Therefore, it is possible to realize a magnetic head capable of flying stably close to the disc surface, and further it is easy to reduce the portion to be machined in the manufacturing process, so that the cost can be lowered.

Examples of the conventional horizontal magnetic head slider are shown in the following publications.

IEEE TRANSACTIONS ON MAGNETICS, vol 25, p.3190, 1989, "A New Thin Film Head Generation" by J. P.Lazzari and P.Deroux-Dauphin. In this conventional example, a recess is formed on the surface of a silicon substrate by means of etching, and a magnetic head element is formed in the recess. In this case, the silicon substrate surface is used as an air bearing surface opposed to a recording medium. Therefore, the terminal of the magnetic head is introduced onto the back of the slider. Accordingly, a through-hole penetrating the silicon substrate is formed so as to extend from the terminal. In this example, the slider body is manufactured by means of machining.

IEEE TRANSACTIONS ON MAGNETICS, vol 25, p.3686, 1989 "A New Approach to Making Thin Film Head-Slider Devices" by Daniel W. Chapman. In this conventional example, a thin film magnetic head element is formed on the substrate from the air bearing surface side, and an insulating film is made to be flat, and then a glass substrate through which a through-hole is penetrated is subjected to bonding. In this way, the slider body is made. After that, the substrate is etched for removal, and the slider body is cut by means of machining.

In the above conventional examples, it is necessary to provide the manufacturing processes of machining the slider body, assembling a head suspension to the slider individually, forming a through-hole penetrating the substrate, embedding a conductor in the through-hole, and bonding of a glass substrate. Accordingly the manufacturing process becomes complicated.

SUMMARY OF THE INVENTION

The first object of the present invention is to provide a thin film magnetic head slider of high performance and low cost and further to provide a method for easily manufacturing the thin film magnetic head slider without forming a through-hole or bonding a glass substrate.

The second object of the present invention is to provide a thin film magnetic head slider to be easily manufactured without forming a through-hole and bonding a glass substrate, in which the magnetic head element can be highly accurately positioned so as to realize highly dense recording and enhance the reliability by adding a tracking mechanism (the tracking mechanism minutely moves the magnetic head element in a tracking direction approximately perpendicular to the moving direction of the recording medium) for the thin film magnetic head element or by adding a minute distance movement mechanism capable of minutely moving the magnetic head in the direction of a loading and unloading recording medium so that the magnetic head can approach or leave the recording medium.

The third object of the present invention is to provide an electrostatic actuator suitable for a drive mechanism to be used for the tracking mechanism or the loading and unloading mechanism in the above thin film magnetic head element.

According to an aspect of the present invention, there is provided a method for manufacturing a thin film magnetic head slider having a media opposing surface which is adapted to be opposed to a recording medium, said method comprising the steps of: providing a slider material on a surface of a substrate, or on a surface of a sacrificial layer on substrate, said surface of the substrate or said surface of the sacrificial layer being formed beforehand with a particular shape for forming said media opposing surface; forming said slider on said surface of the substrate, or on said surface of the sacrificial layer; and removing said substrate, or said sacrificial layer and substrate from said slider.

According to another aspect of the present invention, there is provided a thin film magnetic head slider adapted to be opposed to a recording medium comprising: a slider body provided on a surface of a substrate or on a surface of a sacrificial layer provided on substrate, the substrate or the sacrificial layer and substrate being separate from the slider body; a tracking mechanism supported by a stationary section of the slider body so that a movable section which is a portion of the slider body can be moved in a tracking direction approximately perpendicular to a moving direction of said recording medium; and at least an opposed magnetic pole of a thin film magnetic head element, adapted to be opposed to the recording medium, provided in a movable section of the tracking mechanism.

According to still another aspect of the present invention, there is provided a thin film magnetic head slider adapted to be opposed to a recording medium comprising: a slider body provided on a surface of a substrate or on a surface of a sacrificial layer provided on substrate, the substrate or the sacrificial layer and substrate being separate from the slider film body; a loading and unloading mechanism supported by a stationary section of the slider body so that a movable section which is a portion of the slider body can be moved in a loading and unloading direction in which the movable section of the slider body approaches and leaves a recording medium; and at least an opposed magnetic pole of a thin film magnetic head element adapted to be opposed to the recording medium, provided in a movable section of the loading and unloading mechanism.

According to a fourth aspect of the present invention, there is provided a thin film magnetic head slider adapted to be opposed to a recording medium comprising: a slider body provided on a surface of a substrate or on a surface of a sacrificial layer provided on substrate, the substrate or the sacrificial layer and substrate being separate from the slider body; said slider body comprising a stationary section and a movable section supported by said stationary section via a support spring in such a manner that said movable section can be moved both in a tracking direction approximately perpendicular to a moving direction of said recording medium and in a loading and unloading direction in which the movable section of the slider film body approaches and separates from a recording medium; and at least an opposed magnetic pole of a thin film magnetic head element adapted to be opposed to the recording medium, provided in a movable section of the tracking mechanism.

According to a fifth aspect of the present invention there is provided an electrostatic actuator comprising: a stationary section having a plurality of teeth parallel to each other; a movable section having a plurality of teeth parallel to the teeth of the stationary section; a support spring for supporting the movable section so that the movable section can be moved with respect to the stationary section in a tooth width direction; and a drive force generating section for moving the movable section to a position at which an electrostatic attraction force in the tooth width direction generated when a voltage is impressed between the teeth of the stationary section and those of the movable section, is balanced with a restoring force of the support spring.

BRIEF DESCRIPTION OF THE DRAWINGS

FIGS. 1(a) to 1(c) are views showing the first embodiment of the thin film magnetic head slider of the present invention, wherein FIG. 1(a) is a perspective view of the slider, seen from the back thereof, before the slider is attached to a head suspension, FIG. 1(b) is a perspective view of the slider seen from the air bearing surface side thereof, after the slider has been attached to the head suspension, and FIG. 1(c) is a cross-sectional view taken along line I(a)—I(a);

FIG. 5(a) to 5(e) are schematic illustrations showing the manufacturing process of the thin film magnetic head slider of the present invention;

FIGS. 10(a), 10(b) and 10(c) are views showing a second embodiment of the thin film magnetic head slider of the present invention, wherein FIG. 10(a) is a perspective view of the thin film magnetic head slider seen from the air bearing surface side, FIG. 10(b) is a perspective view of the thin film magnetic head slider seen from the back side, and FIG. 10(c) is a cross-sectional view taken on line X(b)—X(b) showing a tracking drive mechanism for driving the magnetic head element;

FIGS. 12(a) and 12(b) are views showing a third embodiment of the thin film magnetic head slider of the present invention, wherein FIG. 12(a) is a perspective view of the thin film magnetic head slider seen from the air bearing surface side, and FIG. 12(b) is a perspective view of the thin film magnetic head slider seen from the back side;

FIGS. 27(a) to 27(d) are views showing an embodiment of the head slider, in the drive section of which piezoelectric material is used, wherein FIG. 27(a) is a perspective view of the head slider seen from the air bearing surface side;

FIG. 27(b) is a perspective view of the head slider seen from the back side, FIG. 27(c) is an enlarged cross-secctional view taken on line XXVII(b)—XXVII(b), and FIG. 27(d) is an enlarged cross-sectional view of the drive section;

FIGS. 30(a) and 30(b) are views for explaining the movement of the head slider in the case of driving the drive section using piezoelectric material, wherein FIG. 30(a) is an upper face view, and FIG. 30(b) is a cross-sectional view of the beam; and FIGS. 31(a) and 31(b) are views for explaining the movement of the head slider when the drive section is driven in the loading and unloading direction using piezoelectric material, wherein FIG. 31(a) is a cross-sectional view in the direction of the beam side, and FIG. 31(b) is a cross-sectional view of the beam.

DETAILED DESCRIPTION OF THE PREFERRED EMBODIMENTS

Figure 1A:
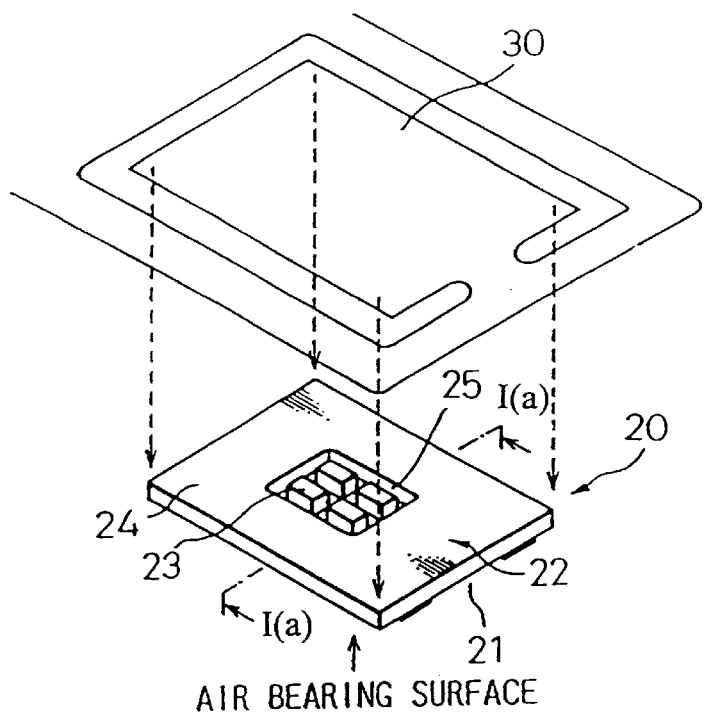
Figure 1B:
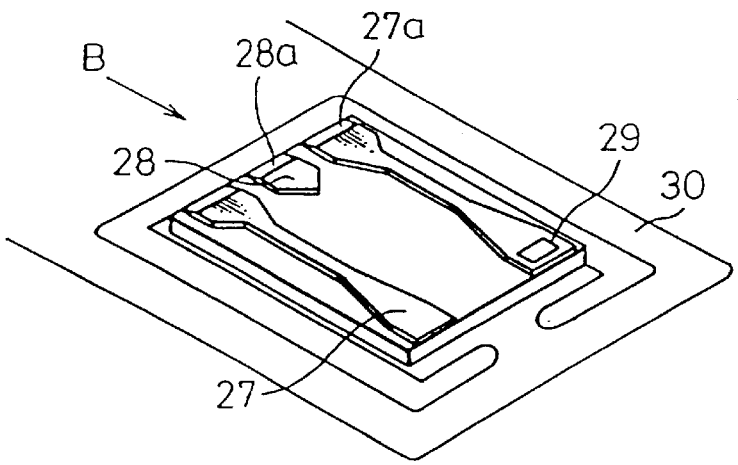
Figure 1C:
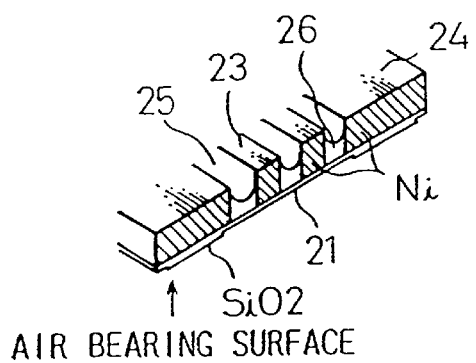

FIGS. 1(a) to 1(c) are views showing the first embodiment of the thin film magnetic slider of the present invention. FIG. 1(a) is a perspective view of the slider 20 before it is assembled to a head suspension 30, wherein the view is seen from the back side, that is, from the side opposite to the air bearing side. FIG. 1(b) is a perspective view of the slider 20 which is attached to the head suspension 30, wherein the view is seen from the air bearing side. FIG. 1(c) is a cross-sectional view taken on line I(a)—I(a) in FIG. 1(a).

The slider 20 includes an air bearing surface 21 made of $SiO_2$ or $Al_2O_3$ and a slider body 22 made of a conductor such as Ni, wherein the slider body 22 is provided on the back of the air bearing surface 21. The slider body 22 is composed of a plurality of terminal pads 23 provided at the center and an outer periphery portion 24. The plurality of terminal pads 23 are arranged in the direction parallel to the air bearing surface. A predetermined clearance 25 is formed between the pads 23 and also between each pad 23 and the outer periphery 24. There are provided 2 sets of terminals, that is, there are provided 4 terminals. Also, there are provided 2 sets of terminal pads 23, that is, there are provided 4 terminal pads 23. In this case, one set of terminals (MR elements) are used as reading head elements, and the other set of terminals (inductive head element) are used as writing head elements. It is possible to use one set of terminals, i.e., 2 terminals, when one element is used for both the reading and the writing head element. In the clearances 25, there is provided a resin 26 such as polyimide in such a manner that the back of the air bearing surface 21 is covered with the resin. In this connection, the outer periphery 24 of the slider body 22 may be used as one of the terminal pads.

As shown in FIG. 1(a), the back of the slider 20 is attached to the head suspension 30. As shown in FIG. 1(b), on the air bearing surface 21 of the slider 20, there are provided two side rails 27 approximately parallel with the disk rotating direction B, one central rail 28 disposed at the center on the leading side, and one thin film head 29. At the leading ends of the side rails 27 and the central rail 28, there are formed tapered portions 27a and 28a, respectively.

The slider 20 has a substantially rectangular shape when it is seen from a side of the media opposing surface or the air bearing surface and the substantially rectangular shape has respective corners each chamfered or rounded. The length of the slider 20 along a moving direction of the recording medium is about 0.8 mm or below 0.8 mm.

Figure 2:
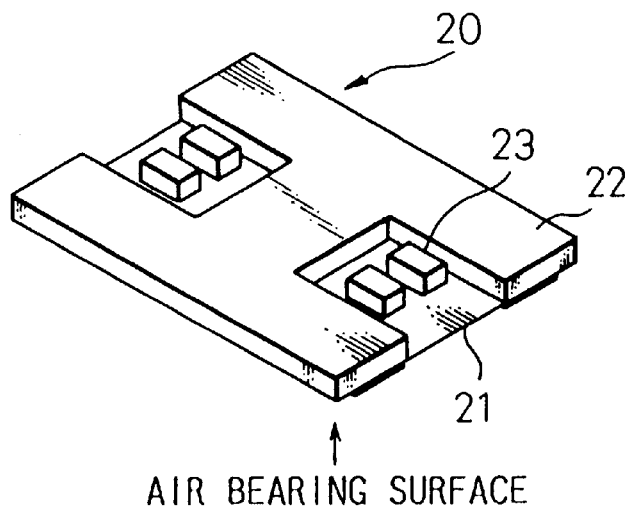
FIG. 2 is a perspective view of a variation of the thin film magnetic head slider of the first embodiment.

In FIG. 2, there is shown a variation of the thin film magnetic head slider. In the embodiment shown in FIGS. 1(a) to 1(c), the conductor of the outer periphery 24 of the slider body 22 surrounds the pads 23. On the other hand, in this variation, a framework of the main body 22 of the slider 20 is composed of a conductor, and terminal pads 23 are arranged outside the framework. As described above, it is possible to arrange the terminal pads 23 at arbitrary positions in the slider 20. In accordance with the shapes of the floating rails 27, 28 (shown in FIG. 1(b)), it is possible to arbitrarily change the shape of the slider body 22 so that the rigidity can be maintained.

Figure 3:
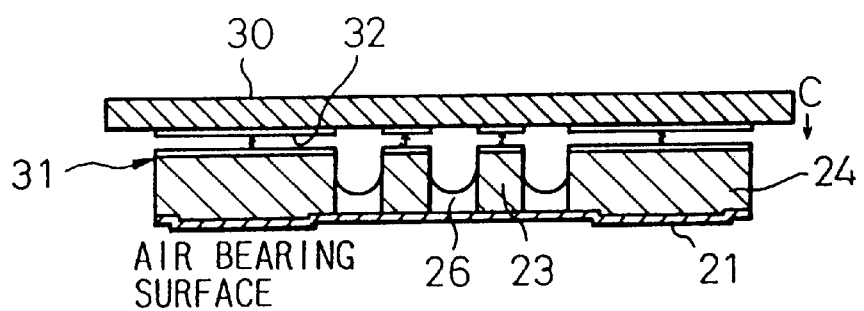
FIG. 3 is a schematic illustration showing a method for connecting the head suspension to the slider.

FIG. 3 is a view showing a connection between the slider 20 and the head suspension 30. In this embodiment, there is provided a bonding metal 31 on the back of the terminal pads 23 and the outer periphery 24 of the main body of the slider 20. By means of thermo-compression bonding, ultrasonic-compression bonding (C) or bonding by conductive adhesive, the pads 23 and the outer periphery 24 of the main body are subjected to bonding with the head suspension 30 on which a terminal conductive section 32 is formed. In this case, the terminal pads 23 are electrically and mechanically connected with the head suspension 30, and the outer periphery 24 of the slider body is mechanically connected with the head suspension 30. When the outer periphery 24 of the slider body is also used as one of the terminal pads, all the connecting sections are electrically and mechanically connected.

Figure 4:
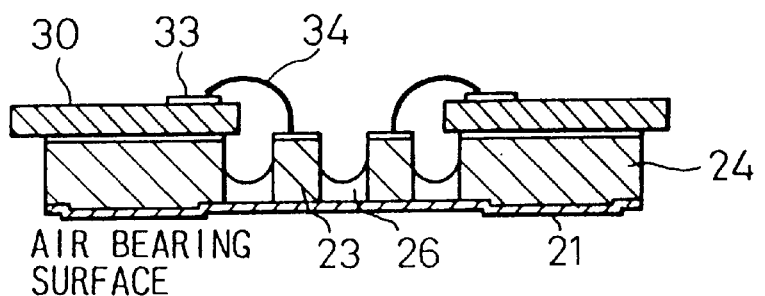
FIG. 4 is a schematic illustration showing a method for connecting the head suspension to the slider.

FIG. 4 is a view showing another embodiment of the connecting method for connecting the slider 20 with the head suspension 30. In this embodiment, the slider 20 and the head suspension 30 are subjected to adhesion or compression bonding, and the terminal pad 23 is connected with the conductive portion 33 provided on the back face of the head suspension 30 through a wire 34 by means of bonding or soldering. Alternatively, a lead wire (not shown in the drawing) disposed along the head suspension 30 may be directly connected with the terminal pad 23.

FIGS. 5(a) to 5(e) are views showing the manufacturing process of the slider 20. These views correspond to sectional views taken on line I(a)—I(a) in FIG. 1(a).

Figure 6A:
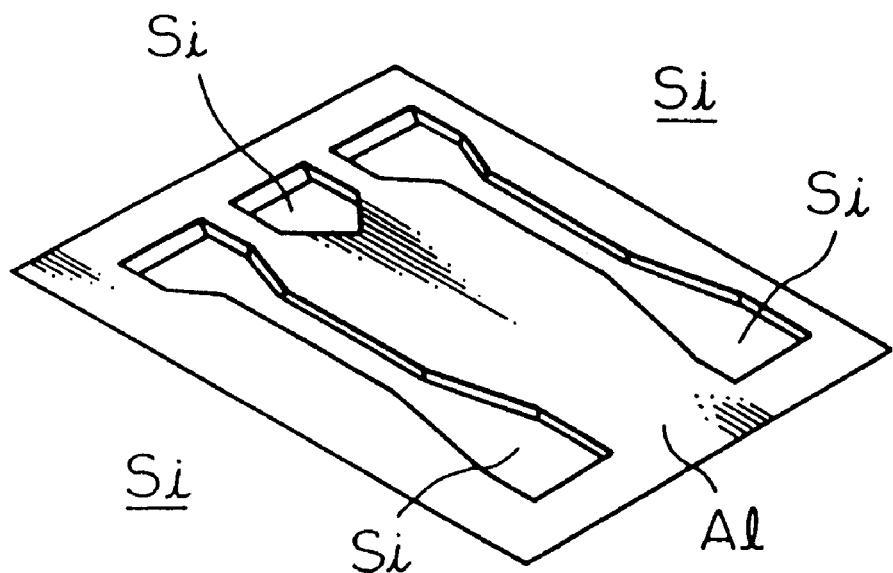
FIGS. 6(a) and 6(b) are schematic illustrations showing a thin film magnetic head slider of the present invention in the middle of the manufacturing process.
Figure 6B:
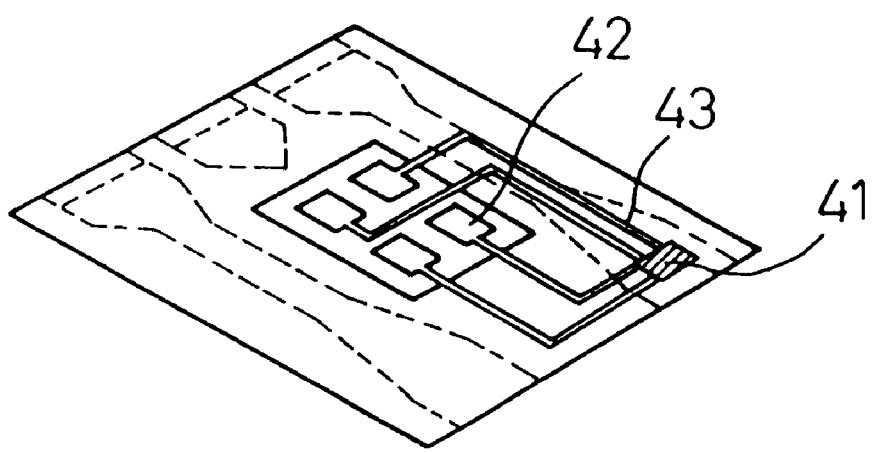

First, on the surface of the Si substrate 46, shapes of the air bearing rails (both side rails and central rail) are formed from material of a sacrificial layer such as Al, Ti and Ta (shown in FIG. 5(a)). FIG. 6(a) is perspective view corresponding to FIG. 5(a). As shown in the drawing, portions on the Si substrate 46 except for the portions in which the air bearing rails are formed later are coated with the sacrificial layer made of Al. In this connection, a method of forming a tapered portion of the floating rail will be described later. Next, a sacrificial layer (Al) is formed on the overall upper surface (shown in FIG. 5(b)). Next, a recording and reproducing head element is formed, and a film of $SiO_2$, diamond-like carbon (carbon) or $Al_2O_3$ is formed on the air bearing surface (shown in FIG. 5(c)). In this connection, after the recording and reproducing head element has been formed and before the film is formed on the floating surface, the head element 41 is connected with the terminal pad forming portion 42 by a lead wire 43 as shown in FIG. 6(b). Next, a conductive film (not shown) used for plating is formed, and a mask (not shown) used for plating is formed from photoresist. After that, the terminal pad 23 and the slider body 22 are formed by plating a metal such as Ni, NiFe, Au or Cu. After the completion of plating, a conductive film in a portion where there is no photo-resist and also a conductive film in a portion where there is no plating film are removed (shown in FIG. 5(d)). A film of a bonding metal 45 such as Au is formed on the terminal pad 23 and on the back side of the slider body 22, and then resin 26 such as polyimide is provided between the terminal pad 23 and the slider body 22 (shown in FIG. 5(e)). In this connection, an inorganic material such as diamond-like carbon or $SiO_2$ may be provided between the terminal pad 23 and the slider body 22. After that, the slider 20 is connected with the head suspension 30 by means of bonding and the sacrificial layer or both the sacrificial layer and substrate are etched so that the slider 20 is separated from the substrate 46 made of Si. In this connection, the slider 20 may, of course, be connected with the head suspension 30 after the slider 20 has been separated from the substrate 46.

Figure 7A:
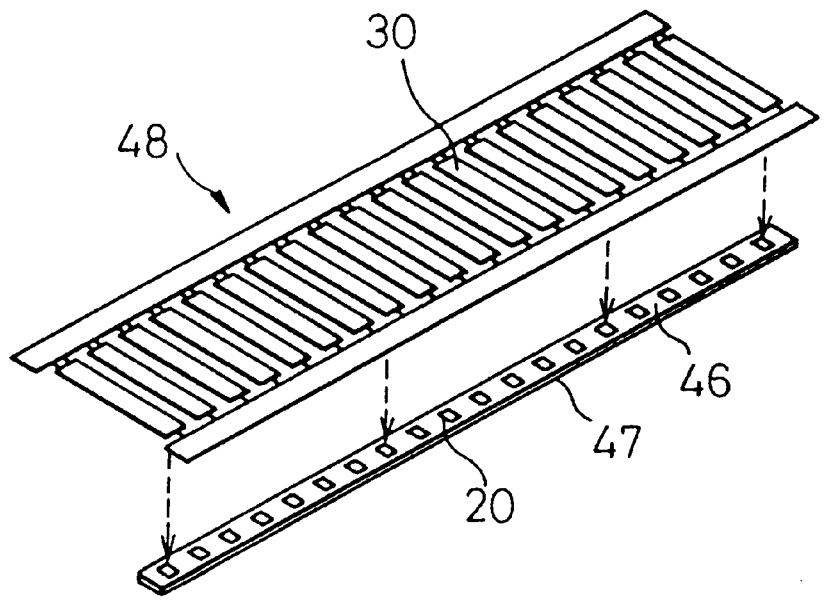
FIGS. 7(a) to 7(c) are views showing a method of simultaneously connecting a plurality of head suspensions with a plurality of sliders.
Figure 7B:
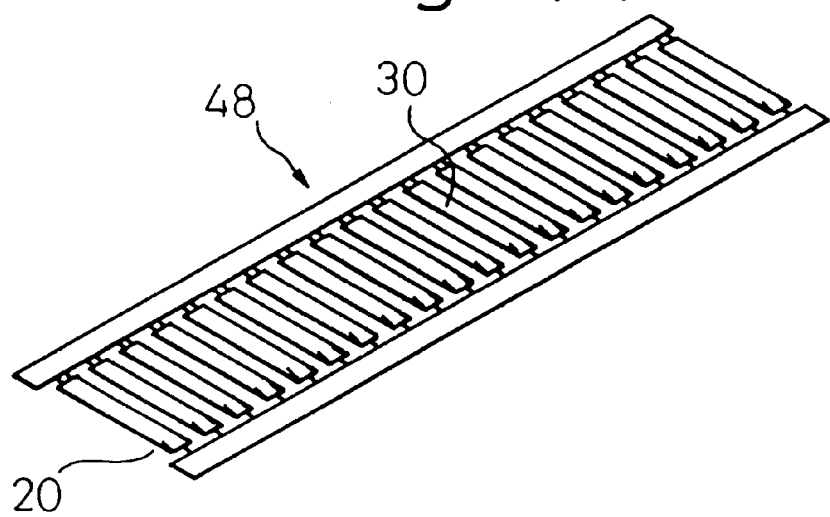
Figure 7C:
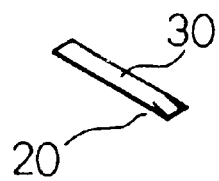
Figure 8A:
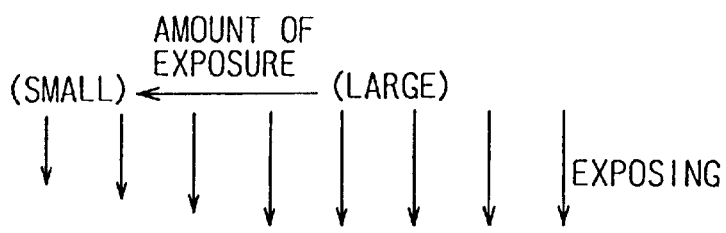
FIGS. 8(a) to 8(d) are views showing an example of the method for forming a tapered portion of the air bearing rail.
Figure 8B:
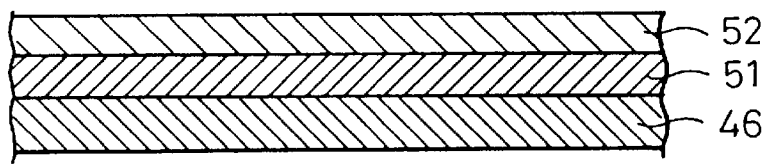
Figure 8C:
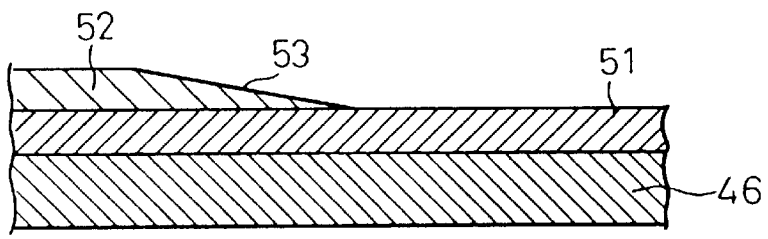
Figure 8D:
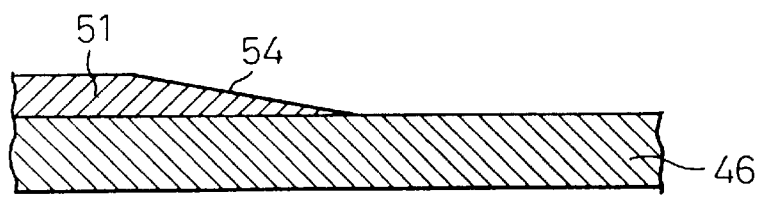

FIGS. 7(a) to 7(c) are views showing a method of assembling the slider 20 of the present invention and the head suspension 30. After sliders 20 have been formed on a substrate 46, this substrate 46 is cut to a block 47 including a plurality of sliders 20. Then a connection frame 48 in which a plurality of head suspensions 30 are connected in a comb-like fashion are simultaneously subjected to bonding onto the slider block 47 (shown in FIG. 7(*a*)). After that, the substrate 46 is separated from the slider block 47 by means of etching (shown in FIG. 7(*b*)). Then each head suspension 30 is cut away from the connection frame 48 (shown in FIG. 7(*c*)). In this way, manufacture of the slider 20 of the invention is completed.

FIGS. 8(*a*) to 8(*d*) are views showing a method of forming a tapered portion of the air bearing rail. According to this method, a sacrificial layer 51 (A1) is formed on a Si substrate 46. Then a photo-resist 52 is coated on the sacrificial layer 51 and exposed. In this case, exposure is made in such a manner that a quantity of exposure to the tapered portion is to be smaller than that of other portions and gradually reduced (shown in FIG. 8(*a*)). This method is commonly used as a method of forming a photo-resist pattern as a three-dimensional shape. For example, this method is described in Japanese Unexamined Patent Publication No. 61-107514 or the following documents.

W. Henke, W. Hoppe, H. J. Quenzer, P. Staudt-Fischback and B. Wagner "Simulation and Experimental Study of Gray-Tone Lithography for the Fabrication of Arbitrarily Shaped Surface" IEEE, Micro Electro Mechanical Systems, p. 205, 1994.

The photo-resist is developed so that the tapered portion 53 is formed (shown in FIG. 8(*b*)). Then the sacrificial layer is etched by means of ion milling or sputter etching (shown in FIG. 8(*c*)), so that the pattern of the sacrificial layer 51 having the tapered portion 54 is completed (shown in FIG. 8(*d*)). After that, a sacrificial layer is formed all over the surface, and then a air bearing rail (not shown in the drawing) made of $SiO_2$ is formed on the sacrificial layer 51.

Figure 9A:
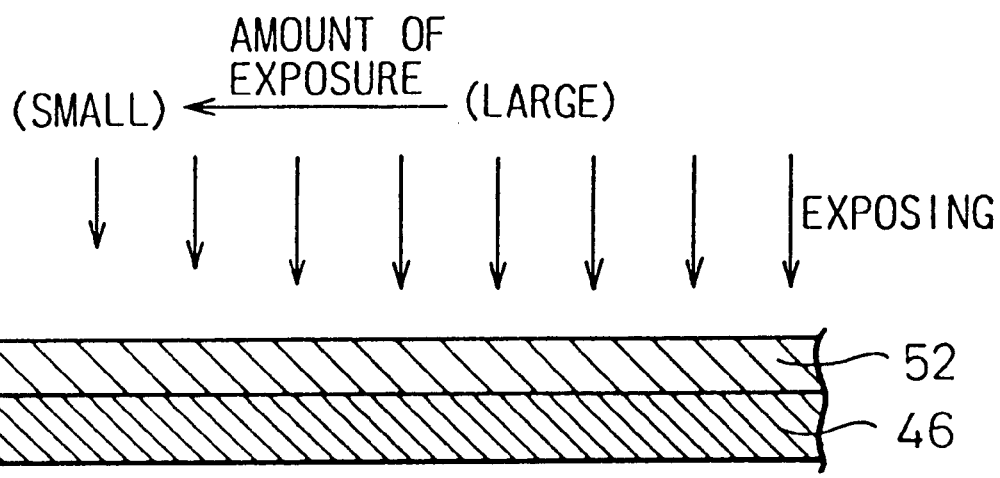
FIGS. 9(a) and 9(b) are views showing another example of the method for forming a tapered portion of the air bearing rail.
Figure 9B:
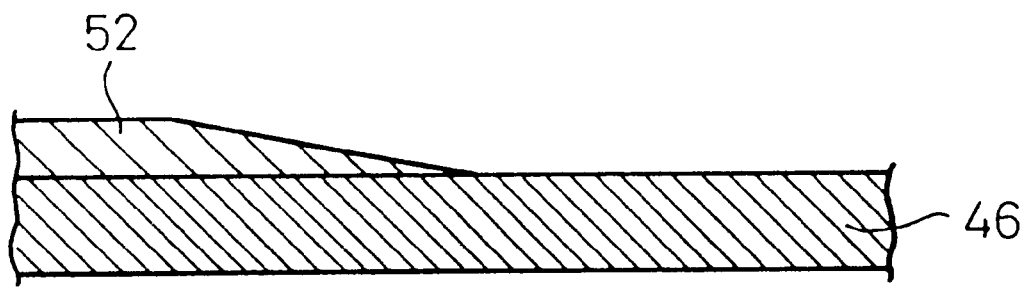

FIGS. 9(*a*) and 9(*b*) are views showing another embodiment of the method of forming a tapered portion of the air bearing rail. According to this embodiment, unlike the method shown in FIGS. 8(*a*) to 8(*d*), it is not necessary to form the sacrificial layer 51 made of Al, and the photo-resist 52 is coated on the substrate 46. Then the photo-resist 52 is exposed while the quantity of exposure light is adjusted (shown in FIG. 9(*a*)). After that, the photo-resist 52 is hardened by heat or ultraviolet rays, so that the sacrificial layer can be formed. Alternatively, a sacrificial layer is formed all over the surface. In this connection, the hardened photo-resist may be made of material which is not dissolved in the etching separation. Alternatively, not only the tapered portions but also all the air bearing rails may be made of the photo-resist.

According to the embodiments described above, the terminal pad portion and the slider body are simultaneously formed from a conductor. Therefore, it is possible to form a slider without forming through-holes in a silicon board or bonding a glass substrate. Accordingly, it is possible to provide a thin film magnetic head slider of high performance and low cost.

Figure 10A:
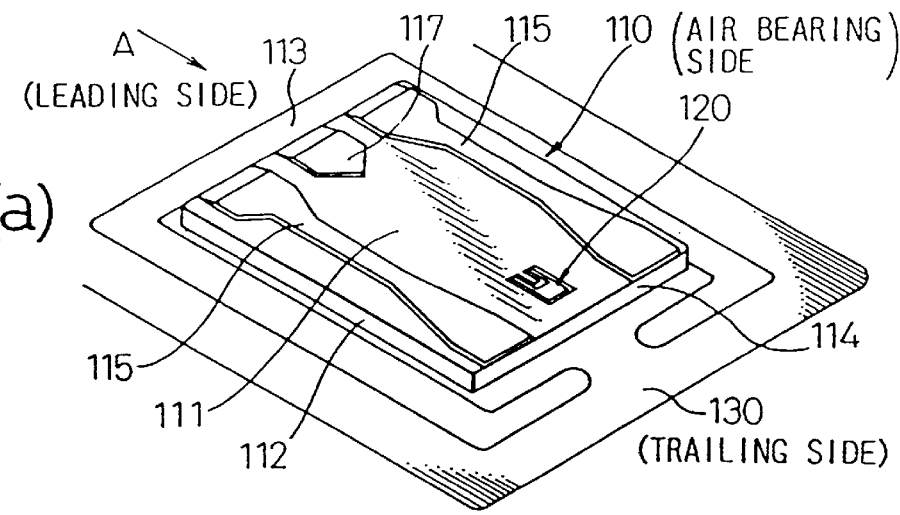
Figure 10B:
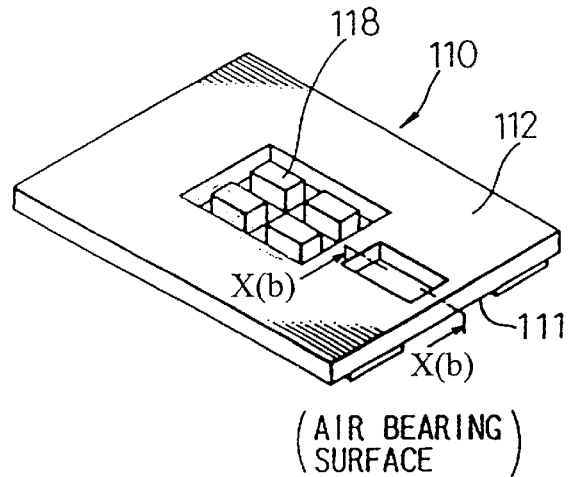
Figure 10C:
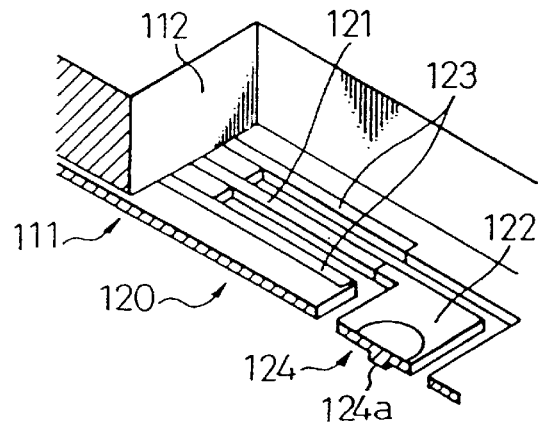

FIGS. 10(*a*) to 10(*c*) are views showing the second embodiment of the thin film magnetic head slider of the present invention. FIG. 10(*a*) is a perspective view of the thin film magnetic head slider 110 attached to the head suspension 130, wherein the view is seen from the air bearing surface side. FIG. 10(*b*) is a perspective view of the thin film magnetic head slider 110 before it is attached to the head suspension 130, wherein the view is seen from the back side (the opposite side to the air bearing surface). FIG. 10(*c*) is a cross-sectional view taken on line X(*b*)—X(*b*) in FIG. 10(*a*).

Portions of the air bearing surface layer 111 made of $SiO_2$ or $Al_2O_3$ protrude into the air bearing surface of the slider 110 opposed to a recording medium, so that two air-bearing rails 115 are formed which extend from the leading side 113 to the trailing side 114 with respect to the recording medium which moves in the direction of arrow A. There is provided a central rail 117 on the leading side 113 side between the two air bearing rails 115. The body 112 of the slider 110 and the terminal pads 118 (shown in FIG. 10(*b*)), which are formed on the back of the air bearing surface layer 111, are subjected to metallic plating with Ni.

There is provided an element drive mechanism 120 (in this embodiment, a tracking mechanism) on the air bearing surface 111 between the two air bearing rails 115 and also between the terminal pads 118 and the trailing side 114. That is, the metallic plating layer made of Ni on the slider 110 body is not provided on the element drive mechanism 120. The length of the slider 110 from the leading side 113 to the trailing side 114 is, for example, 0.5 to 0.8 mm, the width thereof is 0.3 to 0.6 mm, and the thickness thereof is 0.04 to 0.06 mm.

As shown in the cross-sectional view of FIG. 10(*c*), the element drive mechanism of the second embodiment, that is, the tracking mechanism 120 of the second embodiment utilizes an electrostatic attraction force. A movable component includes two parallel springs 121 (only one of them is shown in the drawing) extending from the stationary portion, and two element mount portions 122 supported at the ends of the parallel springs 121. The parallel springs 121 of the movable component and the stationary component opposed to the movable component are made of a metal such as Ni and Cu. Each of the movable and stationary components is provided with a metallic electrode at the opposed portion. When a voltage is applied between the stationary electrode 123 and the movable electrode 121 so as to generate an attraction force, a tracking operation can be conducted.

In this connection, the movable component is arranged in such a manner that only the head element 124 or the end 124*a* of the magnetic pole of the head element protrudes into the recording medium (not shown) side and that the drive electrodes 121, 123 are separate from the recording medium. The reason why the above arrangement is adopted is to prevent dust being attracted to the head element 124 by the applied voltage between the electrodes 121 and 123, so that an air bearing force of the slider 110 is not affected by the drive portion. Although not shown in the drawing, it is preferable to chamfer an end of the slider 110 in the side periphery on the air bearing surface side for the purpose of preventing collision with the recording medium when the attitude of the slider 110 is changed due to rolling or pitching.

Figure 11A:
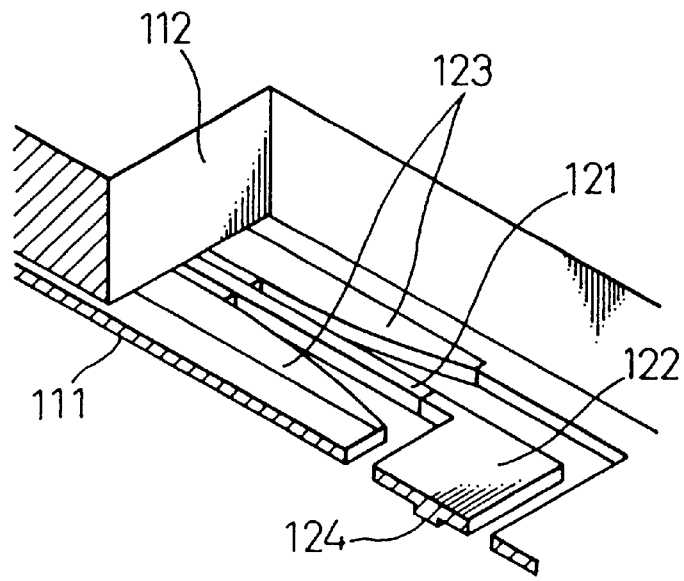
FIGS. 11(a) and 11(b) are perspective views showing variations of the tracking drive mechanism shown in FIG. 10(c)
Figure 11B:
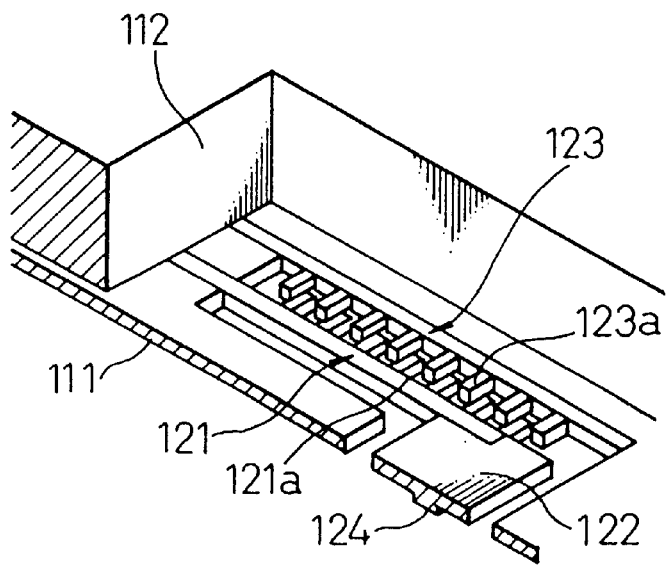

In this connection, the terminal pads 118, which are connected with a terminal connecting section (not shown) of the head suspension 130, are disposed at the center on the back of the slider 110. In this case, two sets of terminal pads 118 are arranged, that is, four terminal pads 118 are arranged. One set is used for the head element, and the other set is used for the tracking mechanism FIGS. 11(*a*) and 11(*b*) are views showing variations of the tracking mechanism 120. In the variation shown in FIG. 11(*a*), a surface of the stationary electrode 123 opposed to the movable electrode 121 shown in FIG. 10(*c*) is curved, and the parallel spring 121 of the movable component is deformed along the curved surface of the stationary electrode 123. Due to the foregoing, the quantity of the displacement is increased. In the variation shown in FIG. 11(*b*), the movable component 121 and the stationary component 123 are composed of comb-shaped electrodes 121a and 123a. In this case, an attraction force is generated in a direction parallel with the longitudinal direction of the comb-shaped electrodes. By the attraction force described above, the tracking operation is conducted.

Figure 12A:
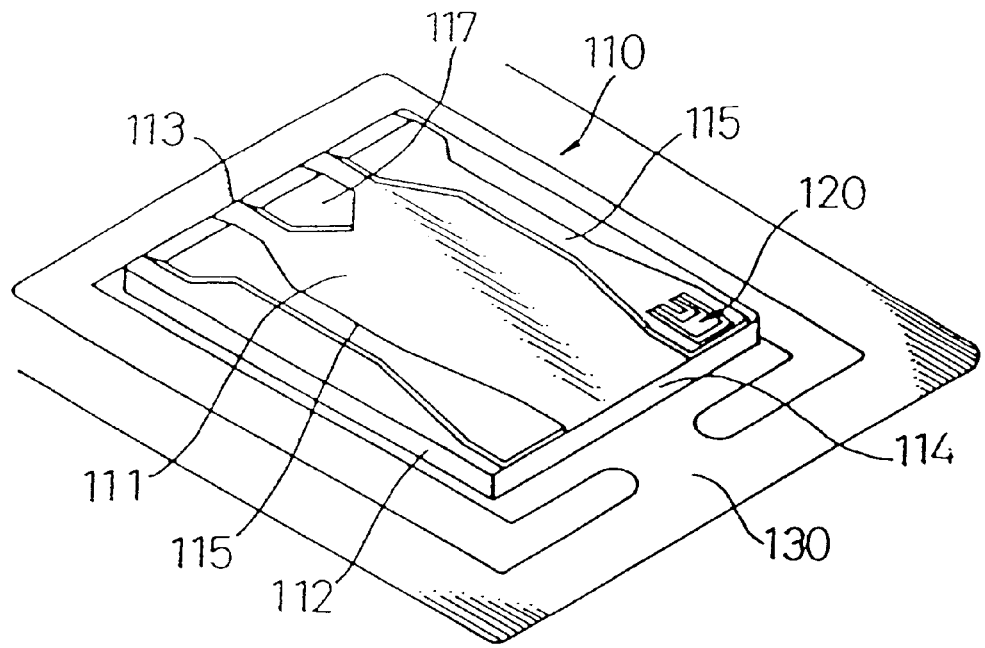
Figure 12B:
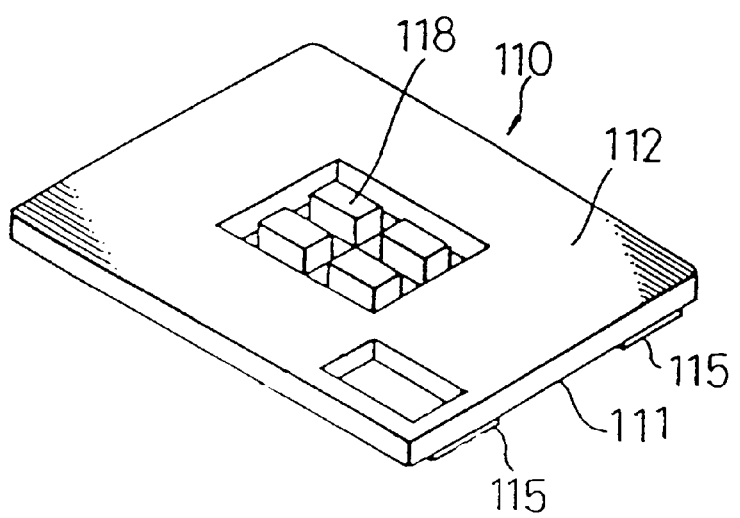

FIGS. 12(a) and 12(b) are views showing a third embodiment of the thin film magnetic head slider of the present invention in which the tracking mechanism 120 is assembled into one of the air bearing rails 115. When the drive section 120 is assembled into the air bearing rail 115 as shown in this embodiment, an area of the portion where the terminal pads 118 are disposed can be increased, and further the slider can be made compact. In this embodiment, any of the tracking drive mechanisms 120 shown in FIGS. 10(c), 11(a) and 11(c) can be adopted. However, as described before, it is preferable that the electrodes 121, 123 are arranged inside (the main body 112 side) with respect to the surface of the air bearing rail 115 so that the electrodes 121, 123 can be separate from a recording medium (not shown). Due to the foregoing, the attraction of dust caused by the applied voltage between the electrodes can be prevented, and further an electric discharge generated between the electrode and the recording medium can be prevented.

Figure 13A:
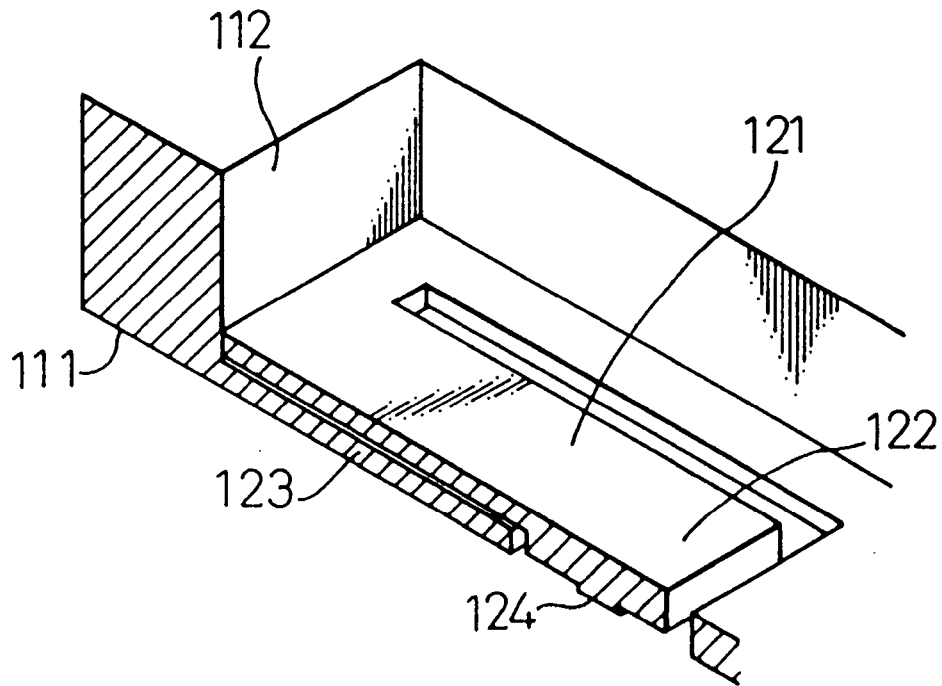
FIGS. 13(a) and 13(b) are cross-sectional and longitudinal cross-sectional view, respectively, of the loading and unloading drive mechanism corresponding to FIG. 10(c)
Figure 13B:
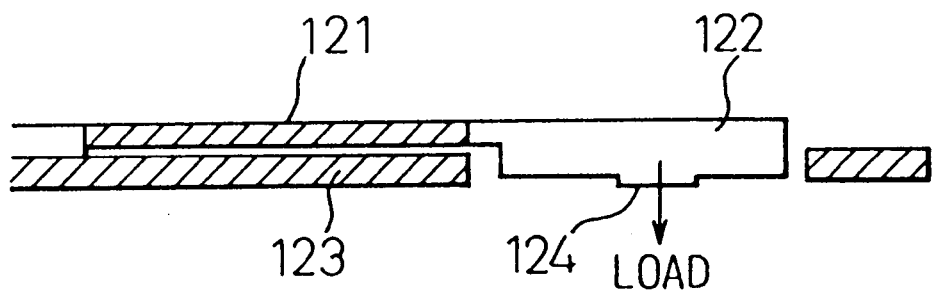

FIGS. 13(a) and 13(b) are views showing the thin film magnetic head of the fourth embodiment of the present invention in which a loading and unloading mechanism is provided. This loading and unloading mechanism 120A may be arranged between the air bearing rails 115 like the first embodiment, or alternatively this loading and unloading mechanism 120A may be assembled into the air bearing rail 115 like the second embodiment.

In this embodiment, the spring 121 of the movable component is arranged above the air bearing surface layer 111 of the slider while a small clearance is made between the spring 121 and the air bearing surface layer 111, and the head element mount 122 is provided at an end of the spring 121. When a voltage is applied between the stationary electrode 123 and the movable electrode 121 provided on the air bearing surface layer 111 side, the movable component 121 is attracted toward the air bearing surface layer 111. Due to the foregoing, the head element 124 approaches or comes into contact with the recording medium (not shown). In this connection, in this mechanism, a voltage may be impressed in the following manner. After the start of rotation of the recording medium, the voltage may be applied, and immediately before the stop of the recording medium, the supply of voltage be stopped. Alternatively, the supply of voltage be started and stopped as being linked with the operation of the head element 124.

In this connection, in the embodiments shown in FIGS. 10 to FIGS. 13(a) and 13(b), when the central rail is arranged at the center of the leading side 113 of the slider 110 and the side rails are arranged on both sides close to the trailing side so that a floating force generating section is formed at each point of the substantial triangle, it is preferable that the tracking mechanism 120 or the loading and unloading mechanism 120A is arranged inside the triangle. The reason is described as follows. Even if the slider is deformed with the residual stress generated on each layer in the case of formation of the slider body and the air bearing surface, since there are three points at which a air bearing force is generated and therefore the drive mechanism and the head element can be arranged inside the triangle, they are seldom affected by the fluctuation of a quantity of fly, so that the flying operation can be stabilized.

Figure 14A:
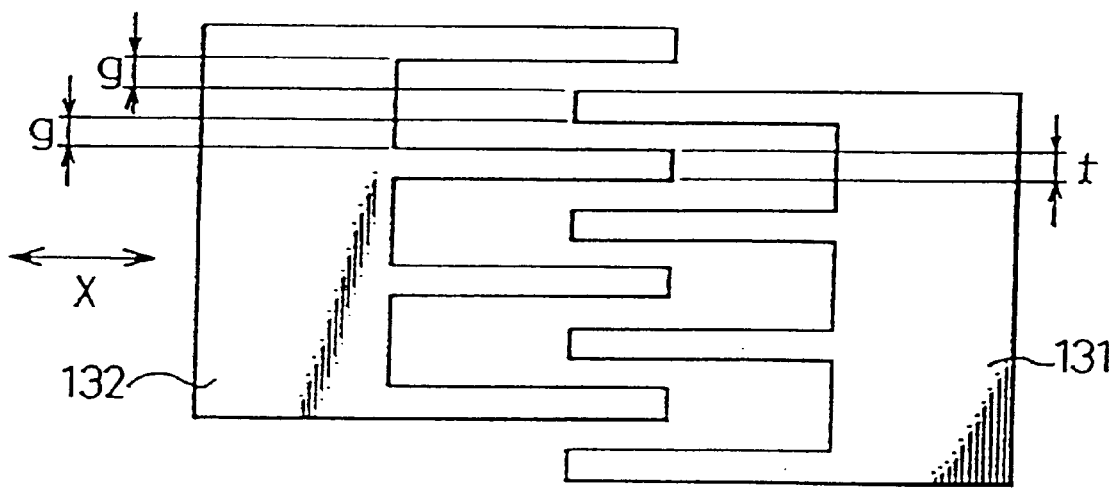
FIG. 14(a) is a schematic illustration showing the principle of the electrostatic actuator of the prior art.
Figure 14B:
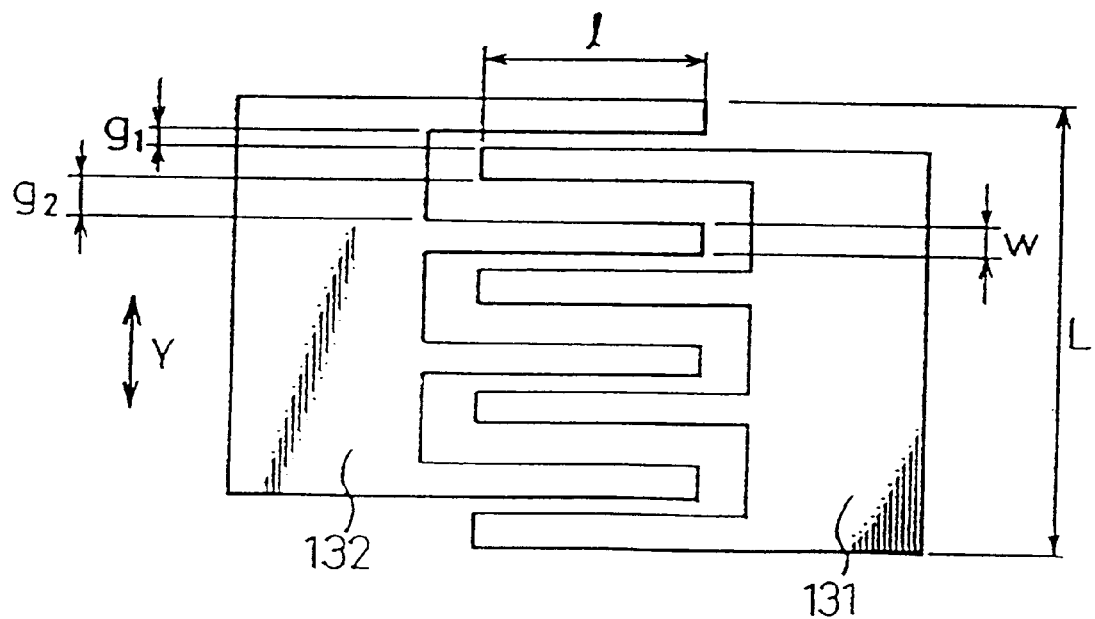
FIG. 14(b) is a schematic illustration showing the principle of the electrostatic actuator of the present invention.

FIGS. 14(a) and 14(b) are schematic illustrations in which the principle of the electrostatic actuator used for the drive mechanism of the present invention is compared with the principle of the electrostatic actuator used for the drive mechanism in the prior art. One of the two opposed comb-shaped electrodes is a stationary section 131, and the other is a movable section 132. When a voltage is applied between the two comb-shaped electrodes, the movable section 132 is moved by a minute distance with respect to the stationary section 131. This type of electrostatic actuator is made as follows. For example, on a silicon substrate on which a thermally oxidized film is coated, there are provided a film of $Si_3N_4$ used as an insulating layer, a PSG (phosphosilicate glass) film used as a sacrificial layer, and a film of polysilicon of 2 $\mu$m thickness used as a comb-shaped electrode. The polysilicon film is subjected to plasma-etching, so that the polysilicon film is formed into a predetermined shape. Finally, the sacrificial layer is removed by means of wet-etching, to obtain the movable section 132.

In the electrostatic actuator of the prior art shown in FIG. 14(a), a tooth on the movable section 132 is disposed at an intermediate position between two adjacent teeth on the stationary section 131, and a voltage is applied between the two opposed comb-shaped electrodes, and a force is generated in a direction so that the engaging length of the comb-shaped electrodes can be increased. On the other hand, in the electrostatic actuator of the present invention shown in FIG. 14(b), a tooth on the movable section 132 side is disposed at a position deviating from the intermediate position between two adjacent teeth on the stationary section 131, so that a force is generated in a direction perpendicular to the tooth length. A difference between the electrostatic actuator of the prior art and that of the present invention will be described as follows.

In the electrostatic actuator of the prior art, the tooth on the movable section 132 is disposed at an intermediate position between two adjacent teeth on the stationary section 131, and a force is generated in the horizontal direction (X-direction) in the figure. The intensity $F_x$ of the force generated in the X-direction is expressed by the equation $F_x = V^2 \epsilon_0 t/g$, wherein g is a clearance between the tooth in the stationary section 131 and the tooth in the movable section 132, t is a thickness of the tooth, V is a voltage to be applied, and $\epsilon_0$ is a dielectric constant in vacuum.

Figure 15:
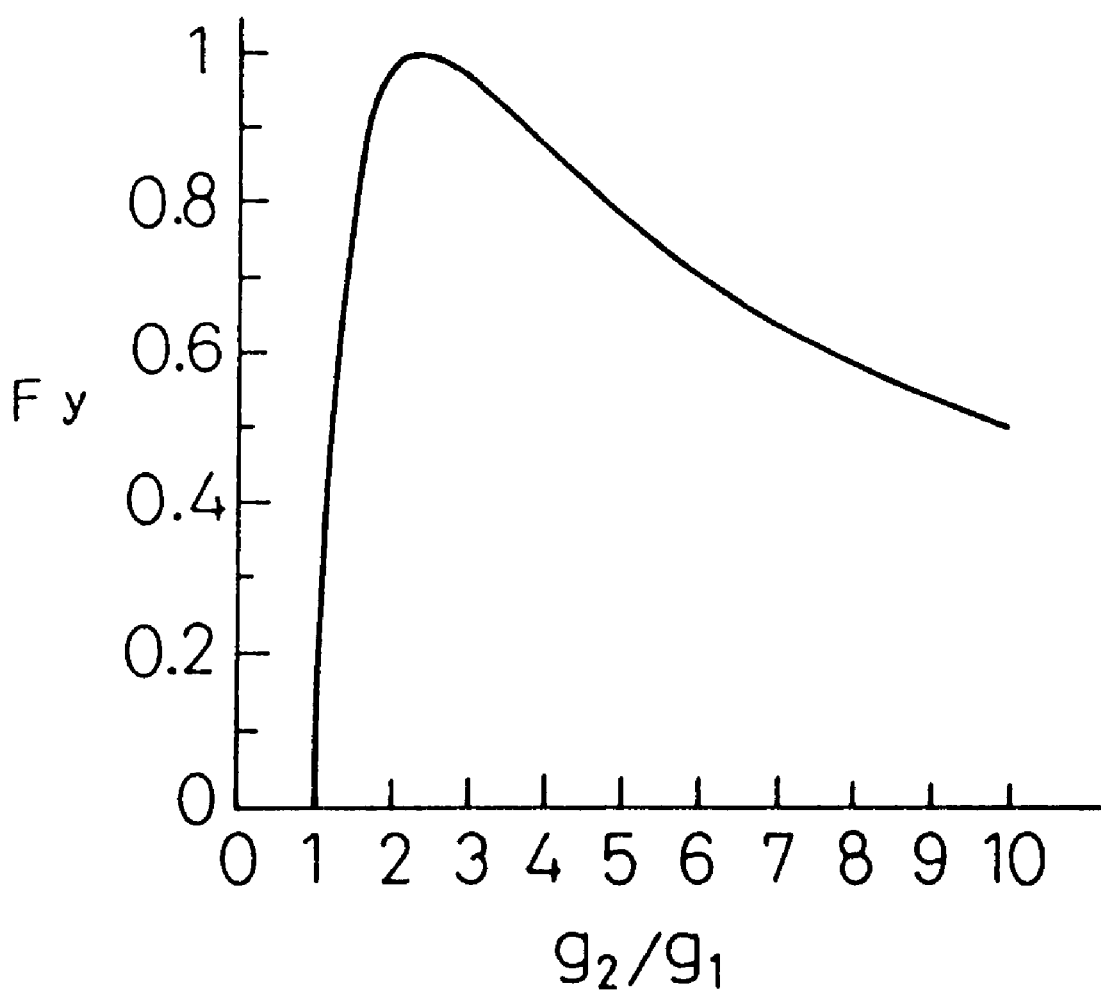
FIG. 15 is a graph showing the relation between the Force and g2/g1 of the electrostatic actuator of the present invention.

On the other hand, in the electrostatic actuator of the present invention, concerning a clearance formed between the tooth on the stationary section 131 and the tooth on the movable section 132, there are provided two types of clearances. One is a narrow clearance g1, and the other is a wide clearance g2. Therefore, it is possible to use a difference between a force in the Y-direction (the direction perpendicular to the tooth length) generated in clearance g1 and a force in the Y-direction generated in clearance g2. In this case, the intensity of the force $Fy=(\frac{1}{2})V^2\epsilon_0 tL(1/g1^2 - 1/g2^2)$. When g1=g and $1/g2^2 \ll 1/g1^2$, the representation of Fy/Fx=L/2g is satisfied. In the case of L>2g, the electrostatic actuator of the present invention generates a higher force than the electrostatic actuator of the prior art. For example, when the gap is formed so as to be g=1 $\mu$m and the tooth is formed so as to be L=200 $\mu$m, a force, the intensity of which is 100 times as high as that of the electrostatic actuator of the prior art, can be generated. Since a force generated in g2 acts in a direction to cancel a force generated in g1 Accordingly, it is preferable that g2 is higher than g1. However, when g2 is excessively high, the number of teeth formed in a predetermined space is limited. Accordingly, there is an optimum value with respect to the value of g2/g1. In the case where L is sufficiently higher than g1, g2 and w, the relation between the force (Fy) and g2/g1 is expressed as shown in FIG. 15. Since the number of teeth is an integer, the graph is not smooth unless the value of L is sufficiently high. Even in this case, when 2<g2/g1<3, the force becomes a maximum. It is practical to use the range of 1.5<g2/g1<5 or 1.2<g2/g1<10.

Figure 16:
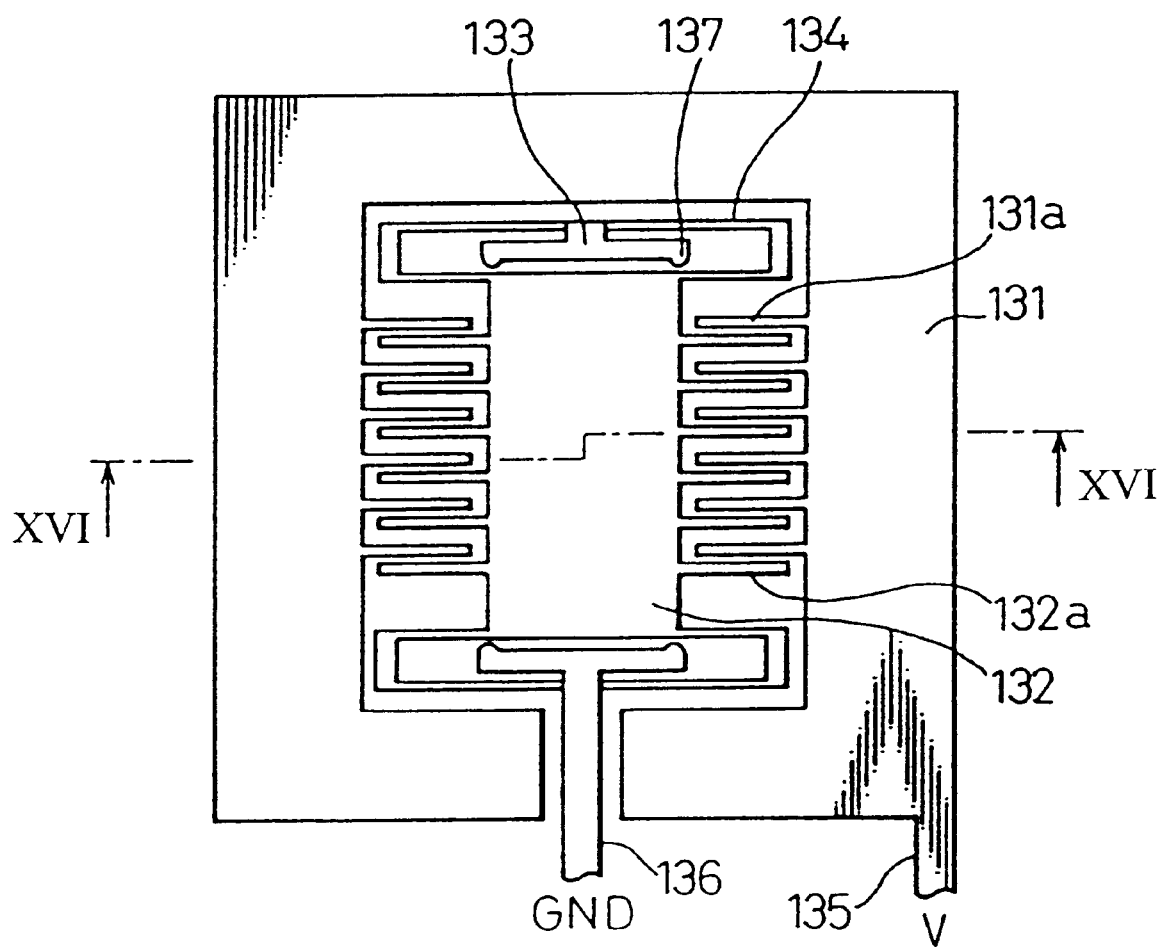
FIG. 16 is a plan view showing an embodiment of the electrostatic actuator of the present invention.
Figure 17A:
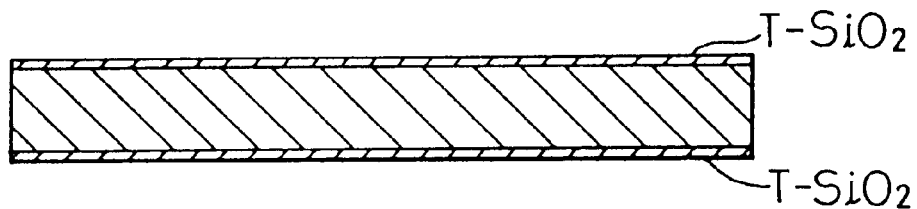
FIGS. 17(a) to 17(e) and FIGS. 18(a) to 18(e) are schematic illustrations for explaining the manufacturing process of the electrostatic actuator of the present invention, wherein the schematic illustrations are arranged in the order of manufacturing process.
Figure 17B:
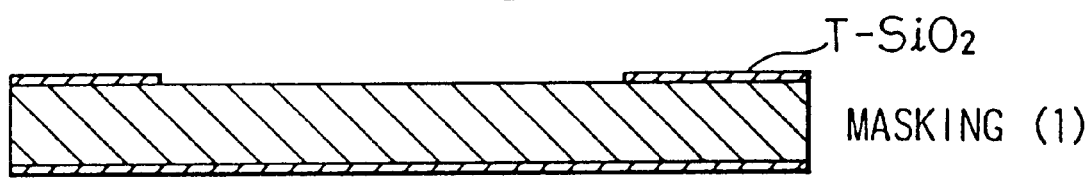
Figure 17C:
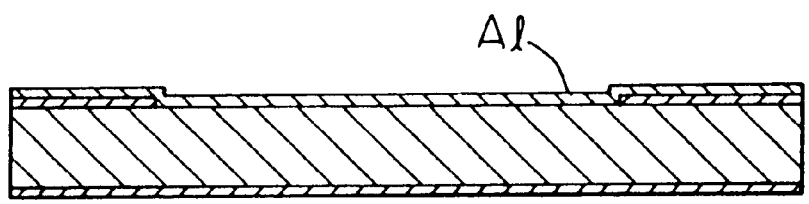
Figure 17D:
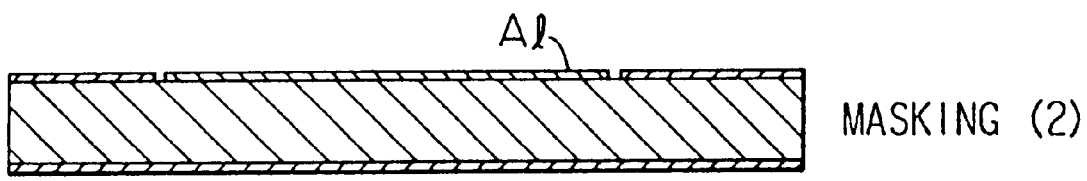
Figure 17E:
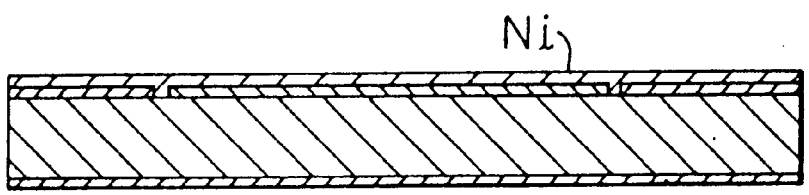
Figure 18A:
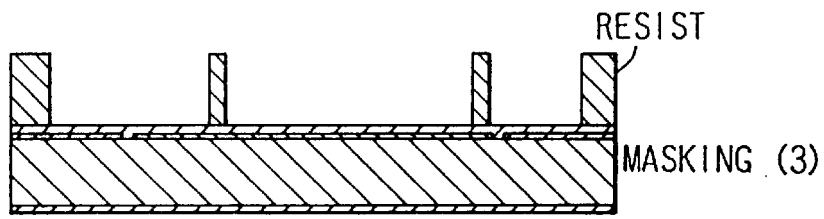
Figure 18B:
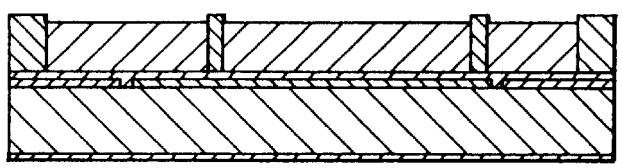
Figure 18C:
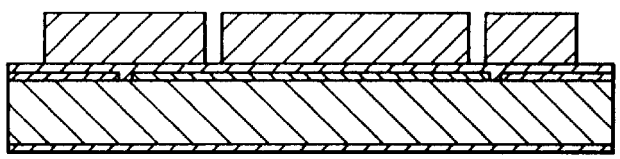
Figure 18D:
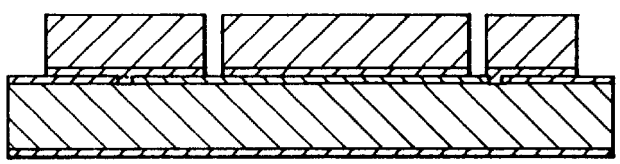
Figure 18E:
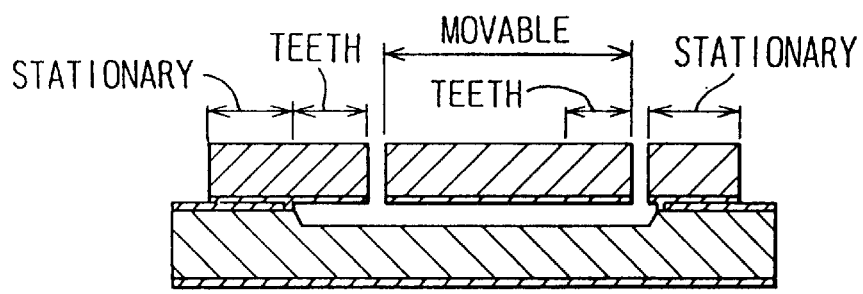

FIG. 16 is a view showing a variation of the electrostatic actuator of the present invention. The outer frame is a body of the stationary section 131 formed by means of plating of Ni. The stationary section 131 is fixed onto a substrate not shown in the figure. On the inner wall of the stationary section 131, there are provided parallel teeth 131a at regular intervals which are arranged toward the inner circumference, wherein the parallel teeth 131a are formed by means of plating of Ni simultaneously with the stationary section 131. These teeth 131a may be fixed onto the substrate, or alternatively these teeth 131a may be provided under the condition that a clearance (not shown) is formed between the substrate and the teeth. A central portion disposed inside the frame of the stationary section 131 is a movable section 132 body formed by means of plating of Ni simultaneously with the stationary section 131 body. There is a clearance between the movable section 132 body and the substrate, so that the movable section 132 can be relatively moved with respect to the stationary section 131. In the movable section 132, there are provided a plurality of teeth 132a which are arranged in parallel with the teeth 131a provided in the stationary section 131, wherein the teeth 132a are disposed at the positions which deviate from the centers of the adjacent teeth 131a. In the figure, there are provided anchors 133 fixed onto the substrate in the upper and lower portions of the movable section 132. Between the anchor 133 and the movable section 132, there is provided a support spring 134 capable of moving the movable portion 132 only in the upward and downward direction. In the right lower portion of the stationary section 131, there is provided a lead 135 to be connected with a terminal (not shown). At the lower support, there is provided a lead 136 to be connected with a terminal (not shown). These leads are formed by means of plating with Ni.

When a voltage is applied between the two leads 135, 136, an electrostatic attraction force is generated between the teeth 131a of the stationary section 131 and the teeth 132a of the movable section 132. Due to the above attraction force, the movable section 132 is attracted upward and moved to a position where the attraction force and an elastic restoring force of the support spring 134 are balanced. Since the electrostatic attraction force is proportional to the square of an electric potential difference, the movable portion 132 is moved in the same direction irrespective of the polarity. However, in order to prevent the influence of noise which tends to affect an object to be mounted on the movable section 132 (in the present invention, the thin film magnetic head), it is preferable that the movable section 132 is electrically grounded.

In this connection, in order to prevent the occurrence of a short-circuit between the teeth 131a of the stationary section 131 and the teeth 132a of the movable section 132 in the case of an excessively high voltage input, there. is provided a stopper 137 which is formed in such a manner that a clearance between a portion of the anchor 133 and the movable section 132 is reduced. The electric potential of the stopper 137, that is, the electric potential of the anchor 133 is the same as that of the movable section 132 which is electrically grounded. Therefore, no problems are caused even when the stopper 137 comes into contact with the movable section 132.

With reference to FIGS. 17(a) to 17(e) and FIGS. 18(a) to 18(e), a method of manufacturing the electrostatic actuator of the present invention will be explained below. These views are cross-sectional views taken on line XVI—XVI in FIG. 16.

In FIGS. 17(a) to 17(e), processing is conducted as follows.

(a) A Si substrate (the crystal plane index of which is 100) on both sides of which thermal oxide films T-SiO$_2$ are formed is used.

(b) Only from a portion where the movable section 132, the teeth 132a of the movable section 132, the teeth 131a of the stationary section 131, and the support spring 134 are formed, the thermal oxide film T-SiO$_2$ on the substrate surface is removed by means of ion-milling.

(c) An Al film to be used as a sacrificial layer is formed on the substrate surface by means of vapor-deposition or sputtering.

(d) The Al sacrificial layer is removed by means of ion-milling from portions except for the portion where the thermal oxide film T-SiO$_2$ has been removed. In this case, a small clearance may be formed in the boundary between the Al sacrificial layer and the thermal oxide film.

(e) A layer of Ni is formed all over the surface by means of vapor-deposition or sputtering so that the layer of Ni can be used as a seed layer of plating. This seed layer is formed in the aforementioned clearance.

In FIGS. 18(a) to 18(e), the processing is subsequently conducted as follows.

(a) A photo-resist is patterned so as to form negative patterns which are used for forming the stationary section 131, movable section 132, support spring 134, stopper 137, anchor 133 and leads 135, 136, which are illustrated in FIG. 16, by means of plating of Ni.

(b) A portion on which the photo-resist is not coated is filled with Ni by means of plating of Ni.

(c) The photo-resist is removed in a solvent.

(d) All of the surface is subjected to ion-milling, so that the portion of the seed layer not coated with platted Ni is removed. This process is not limited to ion milling all over the surface, but a protective photo-resist (not shown) of the same shape may be patterned on the layer of Ni formed by plating, and then this process may be conducted.

(e) When the Al sacrificial layer is removed in a solution of KOH, the movable section 132 is separated from the substrate, and the movable section can be relatively moved with respect to the stationary section. Since the thermal oxide film T-SiO$_2$ has already been removed under the movable section 132, Si substrate at this portion is dissolved, and the solution of KOH easily enters, so that the etching time can be reduced.

Figure 19:
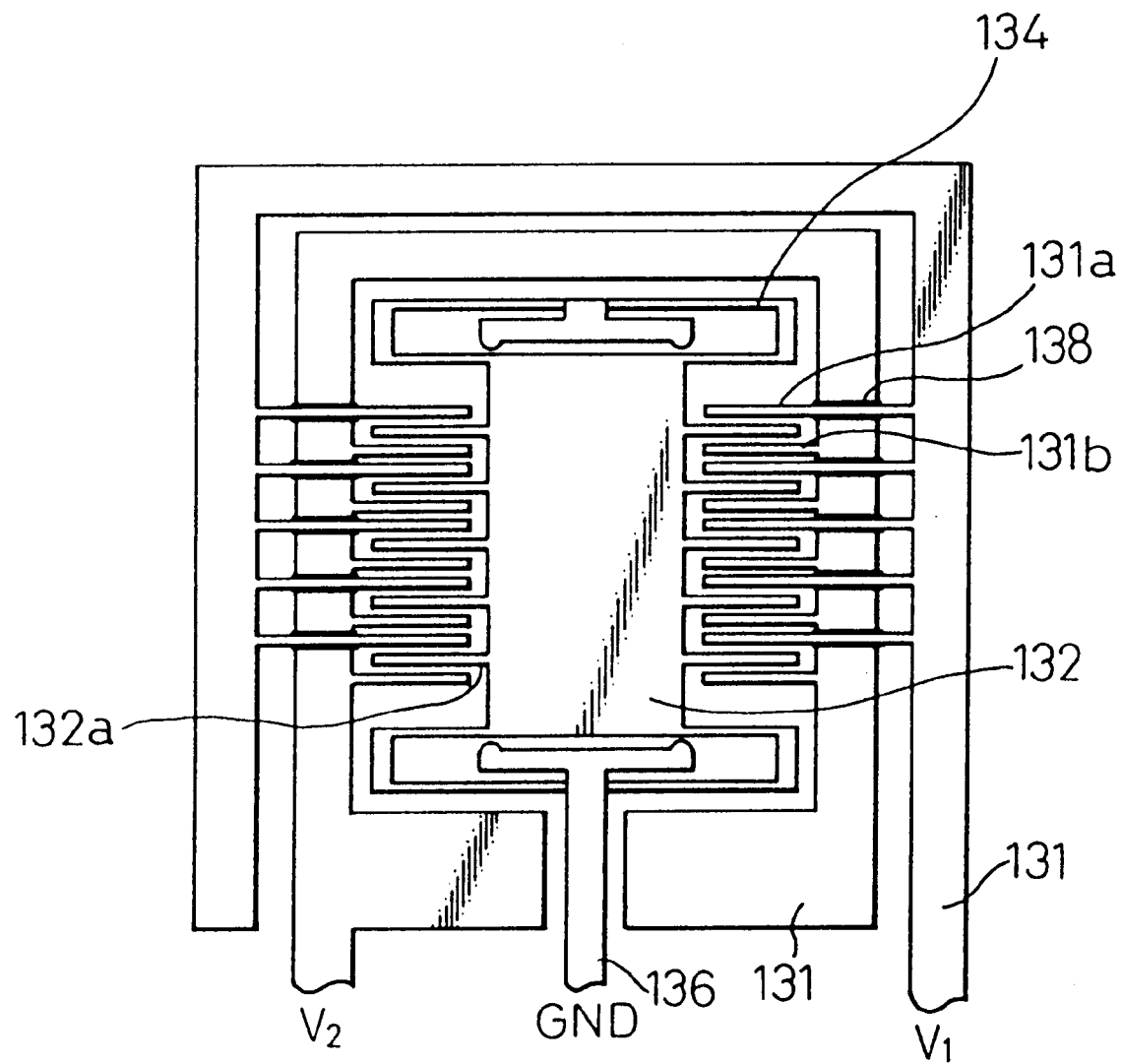
FIG. 19 is a plan view showing another embodiment of the electrostatic actuator of the present invention.

FIG. 19 is a view showing another embodiment of the electrostatic actuator of the present invention. Difference between this embodiment and the embodiment shown in FIG. 16 is that first teeth 131a and second teeth 131b of the stationary section 131 are provided on both sides of teeth 132a of the movable section 132 at regular intervals. The first teeth 131a and the second teeth 132b of the stationary section 131 are electrically insulated from each other by the insulating layer 138 shown in the figure. Therefore, it is possible to apply different voltages upon the first teeth 131a and the second teeth 132b of the stationary section 131, respectively. When a voltage is applied upon the first teeth 131a of the stationary section 131 under the condition that the movable section 132 is electrically grounded, the movable section 132 is moved upward in the drawing. When a voltage is applied upon the second teeth 131b of the stationary section 131, the movable section 132 is moved downward in the figure. Due to the structure of this embodiment, the movable section 132 can be moved upward and downward in the figure. Therefore, the stroke can be increased to twice as much as that of the embodiment shown in FIG. 16.

Figure 20A:
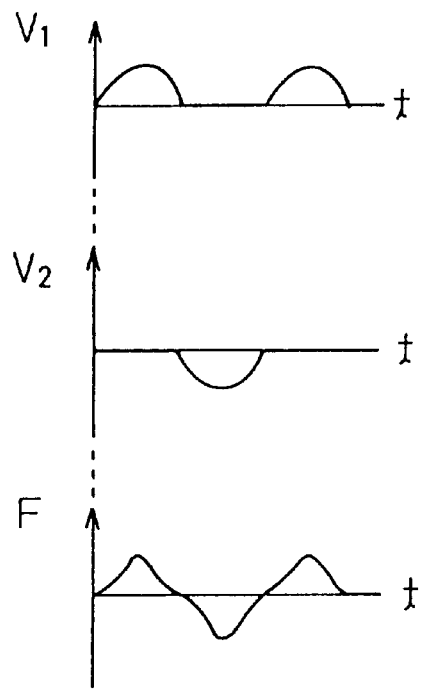
FIGS. 20(a) to 20(c) are graphs showing examples of applied voltage on the electrostatic actuator of the embodiment shown in FIG. 19.
Figure 20B:
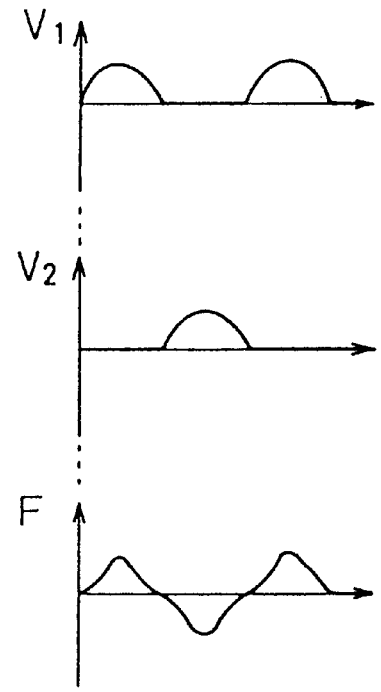
Figure 20C:
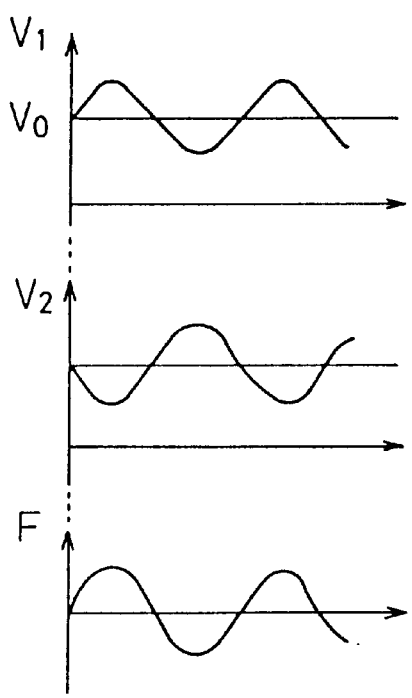

FIGS. 20(*a*) to 20(*c*) are graphs showing examples of the applied voltage upon the first teeth 131*a* and the second teeth 131*b* of the stationary component 131 of the embodiment shown in FIG. 19. Concerning the direction of the force F, the upward direction in the figure is defined as a positive direction. FIG. 20(*a*) is a graph showing a case in which the positive voltage $V_1$ is applied upon the first teeth 131*a* when an upward force is generated and the negative voltage $V_2$ is applied upon the second teeth 131*b* when a downward force is generated. FIG. 20(*b*) is a graph showing a case in which the positive voltage $V_1$ is applied upon the first teeth 131*a* when an upward force is generated and the positive voltage $V_2$ is applied upon the second teeth 131*b* when a downward force is generated. FIG. 20(*c*) is a graph showing a case in which an offset voltage of ½ of the maximum voltage is applied upon the first teeth 131*a* and the second teeth 131*b* of the stationary section 131, and voltages of $V_1$ and $V_2$, the phases of which are reverse to each other, are superimposed so as to drive the unit. When $V_1$ and $V_2$ are expressed by $V_1=V_0+\Delta V$ and $V_2=V_0-\Delta V$, the following expression is set up.

$$F_y\, V_1^2 - V_2^2 = 4V_0\Delta V$$

As shown in the above expression, the force is proportional to $\Delta V$, so that it is easy to control. The method described above is advantageous in that the unit can be driven only by a single power source and the unit can be driven under the condition that the movable section is electrically grounded.

Figure 21:
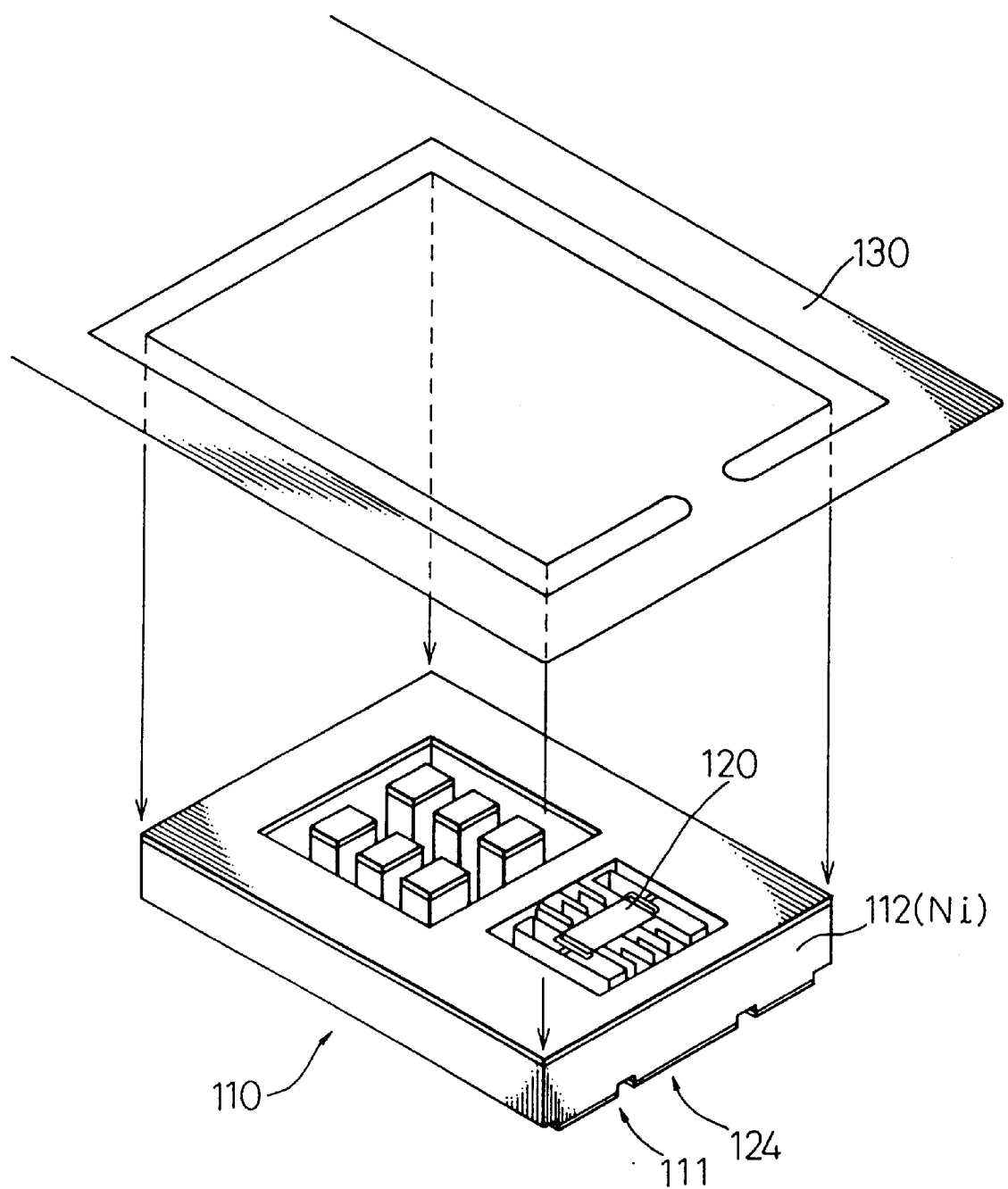
FIG. 21 is a perspective view of the head slider into which the electrostatic actuator is assembled.

Concerning a preferable example to which the electrostatic actuator of the present invention is applied, the electrostatic actuator of the present invention may be assembled into a drive section of the tracking mechanism or the loading/unloading mechanism of the head slider of the magnetic disk unit. An example of the head slider is shown in FIG. 21. This slider 110 is manufactured in such a manner that the horizontal type thin film magnetic head element 124, the air bearing surface layer 111 and the slider body 112 are made in a series of processes and bonded to the head suspension 130. In the magnetic disk unit, a seeking and positioning operation of the head suspension on which the head slider 110 is mounted is conducted by a voice coil motor. In addition to that, a minute actuator (in this embodiment, a tracking mechanism) is mounted on the head slider and the thin film magnetic head element 124 is controlled in a high frequency band range, so that the accuracy of positioning can be increased and the density of recording can be enhanced.

According to the present invention, in order to reduce the process of machining for the reduction of manufacturing cost, as described later, the horizontal head (planar head) 124 and the air bearing surface layer ($SiO_2$) 111 are formed on the substrate on the sacrificial layer, and after the slider body 112 has been formed by means of plating of Ni, the sacrificial layer is removed so that the slider 110 is separated from the substrate. Further, according to the present invention, there is provided a drive mechanism 120 of the electrostatic actuator for minutely driving the element portion 124 in the tracking direction in the head slider 110.

Figure 22:
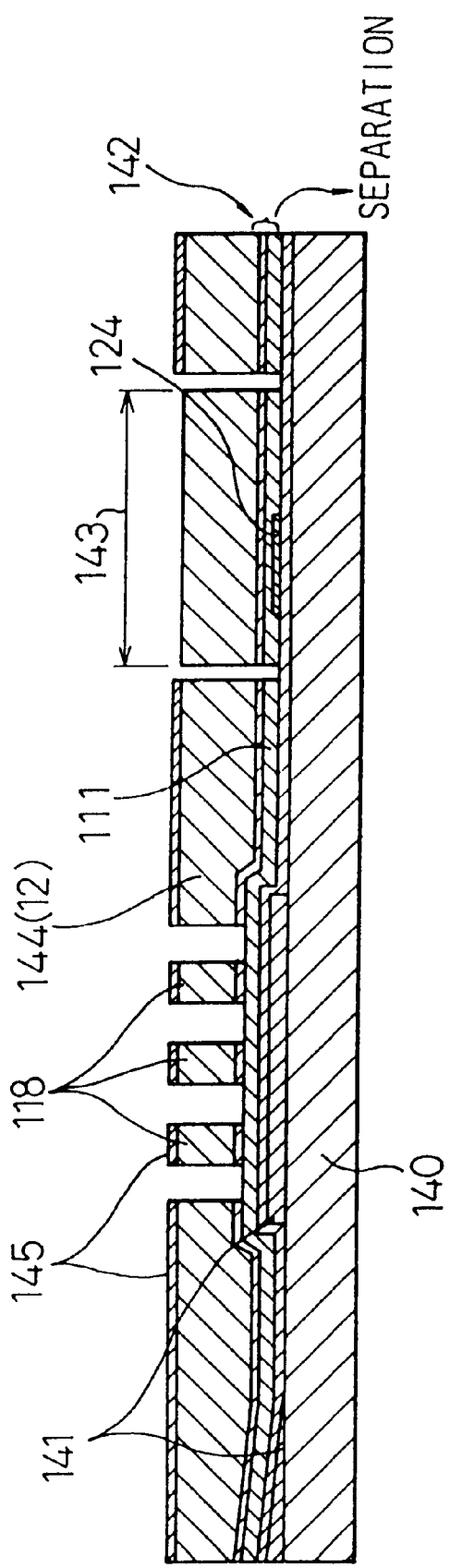
FIG. 22 is a cross-sectional view of the head slider into which the electrostatic actuator is assembled.

FIG. 22 is a cross-sectional view showing the sectional structure of the head slider 110 of the invention. On the substrate 140, there is provided a sacrificial layer 141 made of Al, the shape of which conforms to the shape of the air bearing surface. A horizontal head element 124 is formed on the sacrificial layer 141. After that, a film of $SiO_2$ which will become an air bearing surface layer 111 is formed. This surface works an air bearing surface to the recording medium (not shown in the drawing). In FIG. 22, the layers indicated at 142 includes: a head element, a conductive pattern layer (Au) for connecting each portion of the electrostatic actuator with each terminal, an insulating layer ($SiO_2$), and a seed layer (Ni) of plating of Ni. A movable section 143 of the electrostatic actuator, a stationary section 144 and a support spring are formed above the layer 142 by means of plating together with the slider body 112 and the terminal 118. After that, plating may be additionally conducted to increase the rigidity of the slider body except for the movable section 143 of the actuator. Then, a bonding layer 145 of Au is formed on the uppermost layer, and it is bonded to the head suspension 130 as shown in FIG. 21. When the sacrificial layer 141 is dissolved in a solution of KOH, the head slider 110 is separated from the substrate 140.

The voltage of the reproducing signal of the magnetic disk device is in the order of mV. On the other hand, a voltage for driving the electrostatic actuator is several tens of volts. Accordingly, there is a possibility that the reproducing signal is affected when the actuator is driven. However, according to the present invention, the movable section 143 on which the head element 124 is mounted is electrically grounded as described before. Further, a signal conductor for transmitting a signal from the head element 124 to the terminal 118 can be arranged through the conductive pattern provided below the movable section 143 through the insulating layer and also arranged along the support spring 134 (shown in FIGS. 16 and 19) connecting the movable section 143 of the actuator with the stationary section 144. Since the support spring 134 is also grounded, the signal conductor is shielded, so that the signal is seldom affected by the noise.

According to the electrostatic actuator of the present invention, it is possible to obtain a force to move the movable section in the direction of tooth width. Therefore, the force generation efficiency of the electrostatic actuator of the invention is higher than the force generation efficiency of the electrostatic actuator of the prior art. When this actuator is mounted on the head slider, the head slider and the electrostatic actuator can be integrated into one body. In the process of manufacture, it is not necessary to conduct machining. It is possible to provide a precise head slider capable of positioning the head, to sub-micron accuracies over a stroke of 1 μm.

Figure 23:
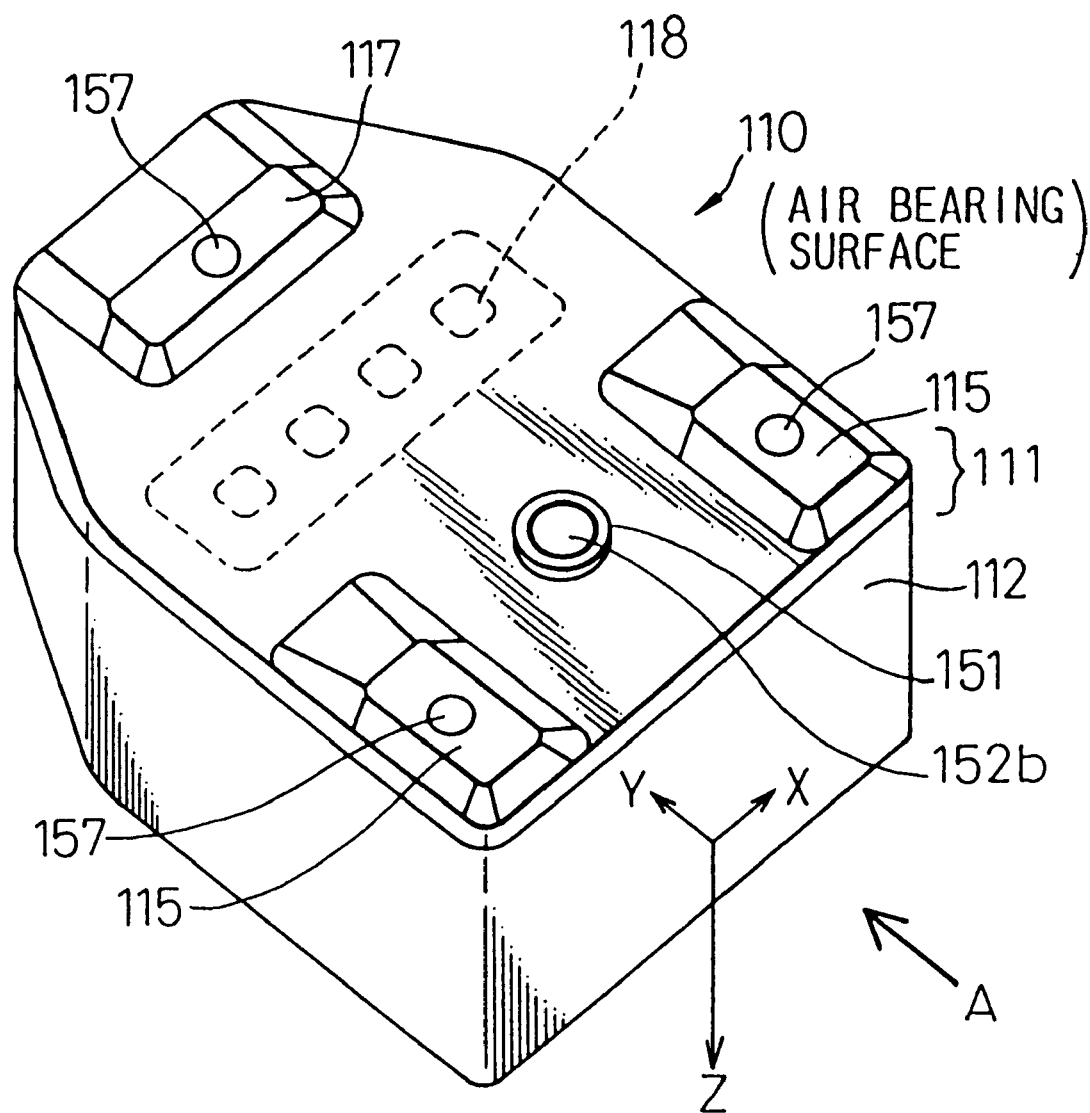
FIG. 23 is a perspective view of the head slider into which an electrostatic actuator capable of minutely moving in the directions of tracking and load and unloading is assembled.
Figure 24:
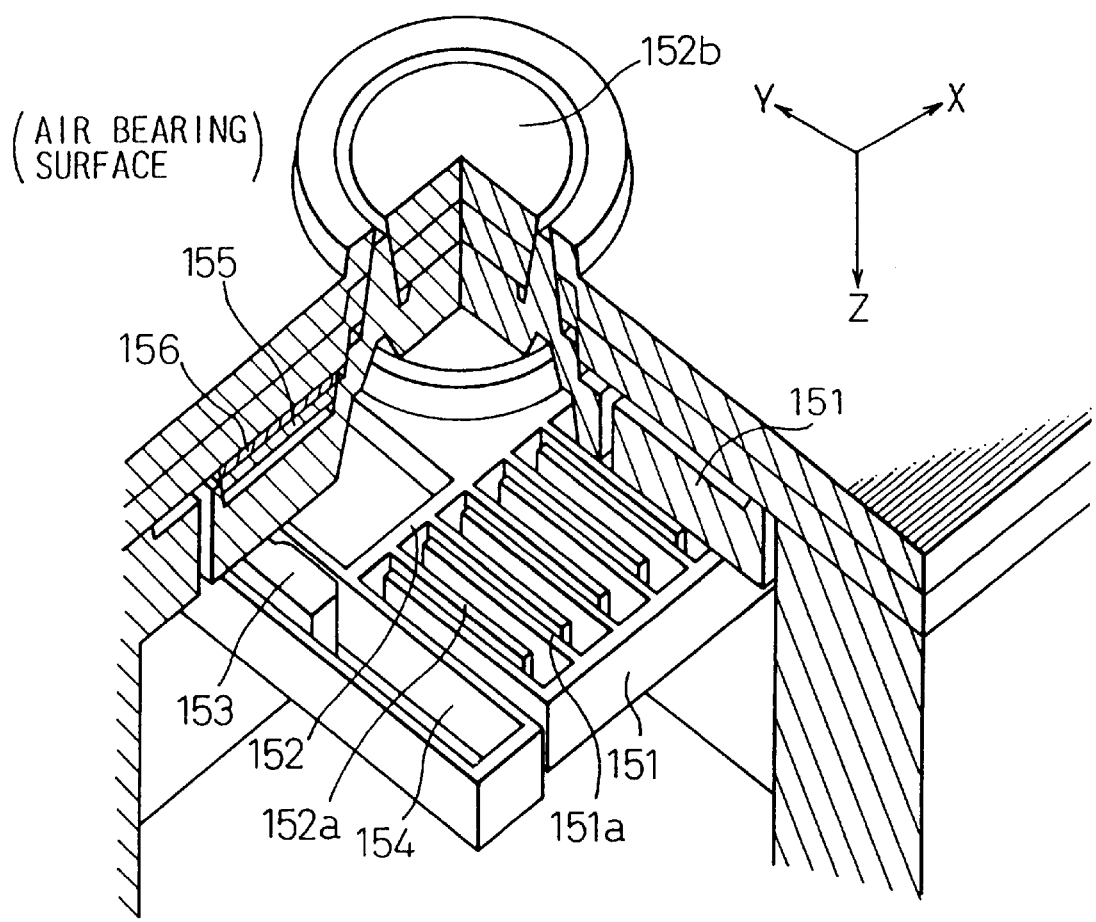
FIG. 24 is a partial sectional view of the actuator drive section of the head slider shown in FIG. 23.
Figure 25:
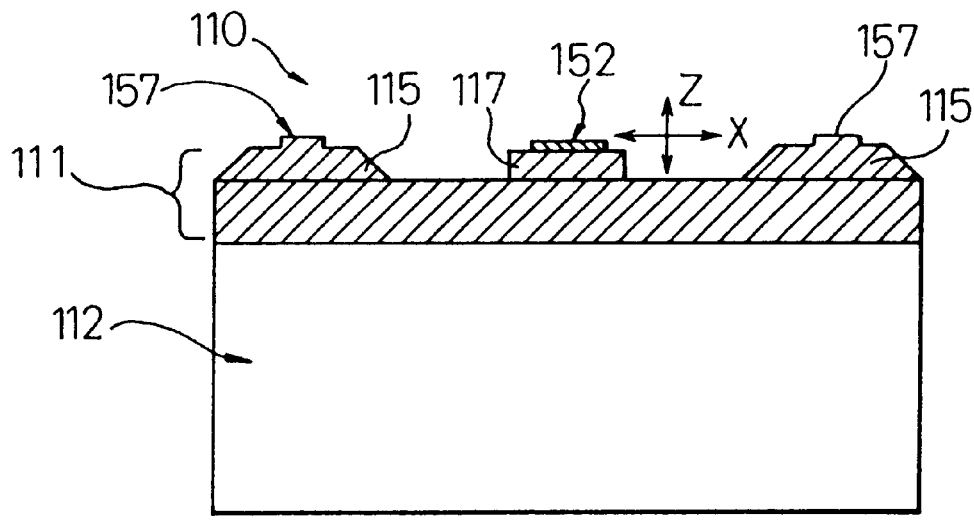
FIGS. 25 and 26 are views of the head slider taken in the direction of arrow A in FIG. 23.
Figure 26:
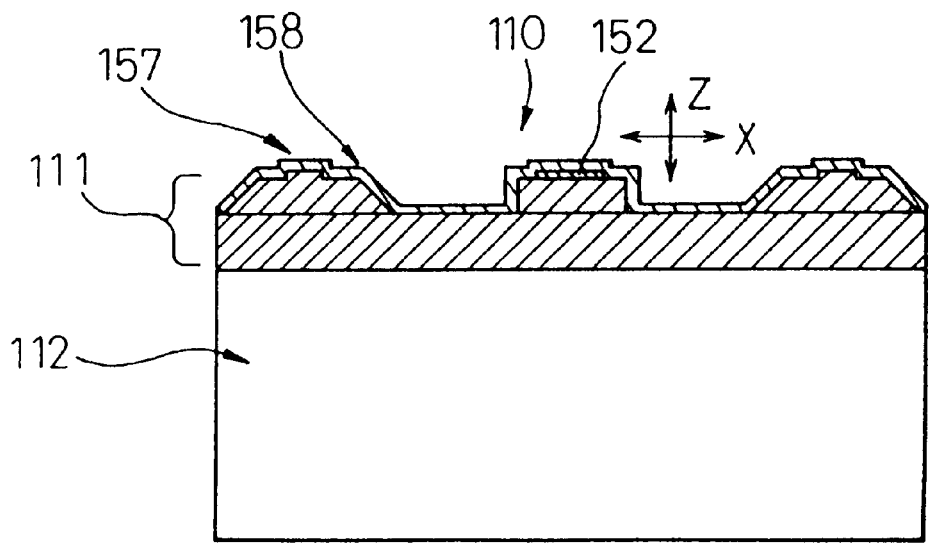

FIGS. 23 to 26 are views showing an embodiment of the head slider into which an electrostatic actuator capable of acting in both directions of tracking and loading/unloading is assembled. These views are shown enlarged in the thickness direction for convenience. FIG. 23 is a perspective view of the slider, wherein the view is seen from the air bearing surface side. FIG. 24 is a partially cutaway view of the electrostatic actuator assembled into the head slider. FIGS. 25 and 26 are views taken in the direction of arrow A.

In these views, reference numeral 110 is a head slider, reference numeral 111 is an air bearing surface layer ($SiO_2$) opposed to a recording medium; 112, a slider body (Ni); 115, a side rail (pressure generating pad); 117, a central rail (pressure generating pad); 118, terminals; 151, a stationary section; 152, a movable section in which a head element is provided; 153, a stopper; 154, a support spring for supporting the movable section 152; 155, an insulating layer, 156, an electrode; 157, a protrusion provided on the side rail 115 and the central rail 117 wherein the protrusion protrudes toward the recording medium side; and 158, a surface protective layer (DLC).

In this embodiment, the movable section 152 is disposed inside a triangle composed of three pressure generating pads 115, 117. The movable section 152 is supported by the support spring 154 so that the movable section 152 can be moved in the transverse direction X (the tracking direction) with respect to the stationary section 151 and so that the movable section 152 can be moved in the upward and downward direction Z (the loading/unloading direction). In the same manner as the embodiment shown in FIG. 16, the stationary section 151 and the movable section 152 respectively include a plurality of parallel teeth 151a and 152a. The teeth 152a of the movable section are disposed at positions which deviate from the centers of the adjacent two teeth 151a of the stationary section. When a voltage is applied between the movable and the stationary section (the movable section 152 is grounded), the movable section 152 is moved with respect to the stationary section 151 in the direction of X to a position at which the electrostatic attraction force and a elastic force of the support spring 154 are balanced.

As shown in FIG. 24, the head element 152b provided on the movable section 152 is exposed so as to be opposed to a surface of the recording medium (not shown). On the other hand, an actuator which includes a portion of the movable section 152 other than the head element 152b, the stationary section 151 and the support spring 154 is covered by a cover portion 151b of the slider body. Therefore, the actuator is prevented from being exposed to the surface of the recording medium. Thus, the actuator is prevented from being unexpectedly contact with the recording medium.

When a voltage is applied upon the electrode 156 provided in the stationary section opposed to a flat portion of the movable section, the movable section 152 is moved by a minute distance in the direction of Z by an electrostatic attraction force acting on the movable section 152, resisting a force of the support spring 154. Accordingly, the head suspension 154 also supports the movable section 152 so that the movable section can be moved in the direction Z.

In this connection, in the embodiment shown in FIG. 25, the protrusions 157 are composed of surface lubricating material, such as, diamond-like-carbon (DLC), so that the lubricating property between the head slider 110 and the recording medium can be enhanced. In the embodiment shown in FIG. 26, the protrusions 157 are formed as portions of the floating surface layer 111 ($SiO_2$), and the entire air bearing surface layer 111 containing these protrusions 157 is covered with the surface lubricating layer 158 (DLC).

As shown in FIG. 23, in this embodiment, the shape of he slider body is formed into a polygonal prism which includes obtuse angle portions. The purpose is the reduction of weight by removing unnecessary portions from both sides of the central pressure generating pad provided in a rectangular parallelepiped body. When the unnecessary portions are removed from both sides of the central pressure generating pad, the possibility of collision of the head slider with the recording medium can be reduced in the case of rolling or pitching of the head slider. Further, when the outer circumferences of the slider and the pressure generating pads are chamfered, the recording medium is seldom damaged even in the case of collision of the head slider with the recording medium. In this case, the chamfered face is not limited to an R-face (rounded surface). When the chamfered face is formed into a C-face (tapered surface), similar effect can be provided.

When the head slider of the present invention is manufactured, it is not necessary to conduct machining. The head slider of the present invention is manufactured by the process based on photolithography. Accordingly, it is possible to form the aforementioned complicated shape without increasing the time and cost necessary for fabrication.

This is an embodiment in which the tracking actuator, the loading/unloading direction driving actuator and the read/write head (inductive head) are mounted on the head slider. Two electrostatic actuators require three terminals while the movable sections are maintained at a common electric potential, that is, the movable sections are grounded, and the head requires two terminals. In this embodiment, the electric potential of the movable section of the actuator is maintained at the same electric potential as that of the slider body, so that the slider body is used as one terminal, and the movable section is connected to the conductive pattern on the head suspension together with the 4 terminals shown in the drawing.

In the preferred embodiment, as shown in FIG. 23, the head slider 110 has a substantially polygonal shape such that the leading end thereof is provided at the respective sides with tapered or obtuse angle portions, i.e., the width of the head slider 110 in the horizontal surface is gradually reduced toward the leading end. Thus, the head slider 110 is prevented from being contact with the recording medium (not shown). However, such obtuse angle portions can be provided at any other portions of the head slider 110 depending upon the arrangement of the protrusions 157. For instance, if a head slider 110 had two side rails 115 at the leading ends and a single central rail 117 at the trailing end, the tapered or obtuse angle portions would be provided at the respective sides of the trailing end.

FIGS. 27(a) to 27(d) are views showing an embodiment of the head slider in which piezoelectric material is used for the drive section. There is provided a mechanism 120 for driving the head by a minute distance in a portion of the slider. The head drive section 120 is attached in the form of a beam so that the head 124 attached to the end (the head mount section 122) can be supported. A thin piezoelectric film made of ZnO or PZT is deposited on the beam. Therefore, when the piezoelectric film is displaced by a minute distance, the head can be moved.

In this case, the head drive section 120 is not exposed onto the air bearing surface, that is, the head drive section 120 is disposed on an upper surface side of the air bearing section. An magnetic pole 124 of the head 124 is exposed only to a portion on the air bearing surface. In this portion, the recording medium (not shown) is subjected to the reading and writing operation.

Next, the drive section 120 to move the head will be explained. As described before, a thin film of the piezoelectric element 124 is deposited on the element mount section 122 of the beam for supporting the head.

Figure 27A:
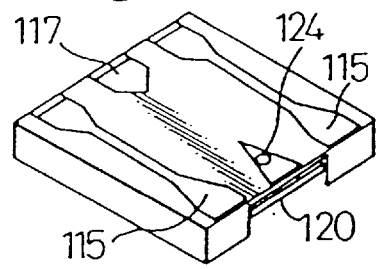
Figure 27B:
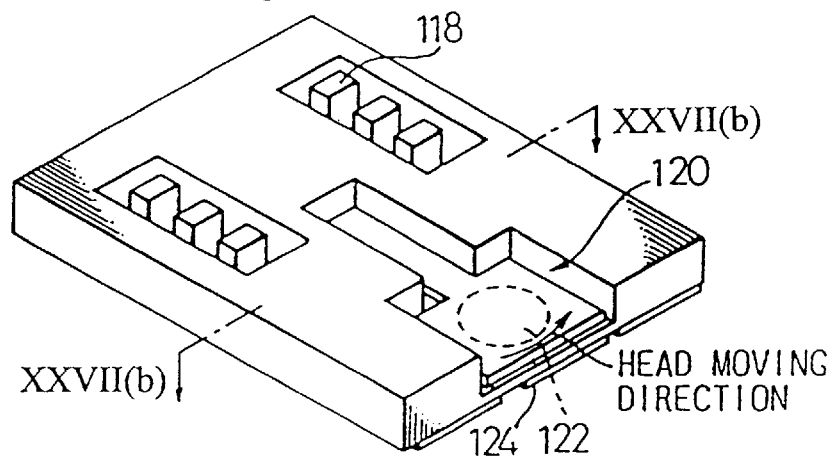
Figure 27C:
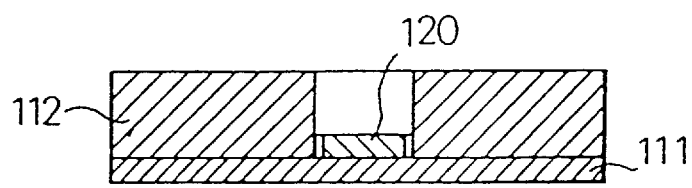
Figure 27D:
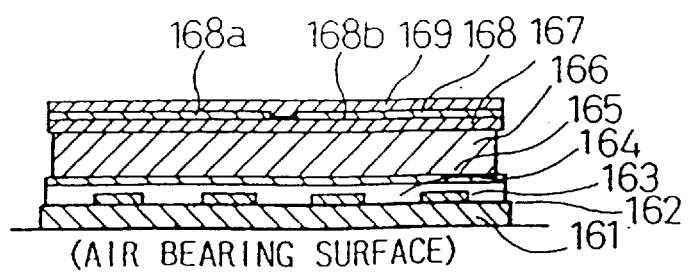

FIG. 27(d) is an enlarged cross-sectional view showing the beam of the drive section 120. Reference numeral 161 is a sacrificial layer (Al) to be removed in the successive process; 162, a carbon film; 163, a head wiring; 164, a shield; 165, a lower electrode of piezoelectricity; 166, a ZnO layer used for a piezoelectric thin film; 167, a $SiO_2$ layer; 168, an upper electrode of piezoelectricity, and 169, an upper protective layer ($SiO_2$).

As shown in the drawing, the upper electrode 168 is divided into two portions 168a, 168b with respect to the center. Under the condition that the lower piezoelectric electrode 165 is grounded, when voltage, the phases of which are reverse to each other, is applied upon one electrode 168*a* and the other electrode 168*b*, respectively, minute displacements, the phases of which are reverse to each other, are generated in the right and left of the beam. Due to the foregoing, the head 124 is displaced by a minute distance in the direction of an arrow in FIG. 27(*b*).

It is possible to use PZT for the piezoelectric thin film 166, although, in this embodiment, a film of ZnO is used. Advantages provided by the ZnO film are described as follows.

(1) It is possible to form a stable film of the orientation by means of sputtering.

(2) As compared with PZT, it is possible to form a film at a low temperature. In the case of PZT, the film annealing temperature is 600° C., and in the case of ZnO, it is not necessary to anneal the film above 200° C.;

(3) Therefore, unlike the case of PZT, it is not necessary to conduct the polarization processing; and (4) A film of ZnO has been used for an SAW filter available on the market, and, therefore, the reliability is high.

Disadvantages of the ZnO film are described as follows.

(1) The piezoelectric constant of ZnO is lower than that of PZT; and (2) ZnO is easily dissolved in acid or alkali. Since the thin film of ZnO is easily dissolved in acid or alkali, the following process is taken. In order to prevent the dissolution of the thin film of ZnO in the case of etching the sacrificial layer (Al) 161, as illustrated in FIG. 27(*d*), it is preferable to cover the ZnO film 166 with the electrode material 165 and 168 and SiO$_2$ 167.

Figure 28:
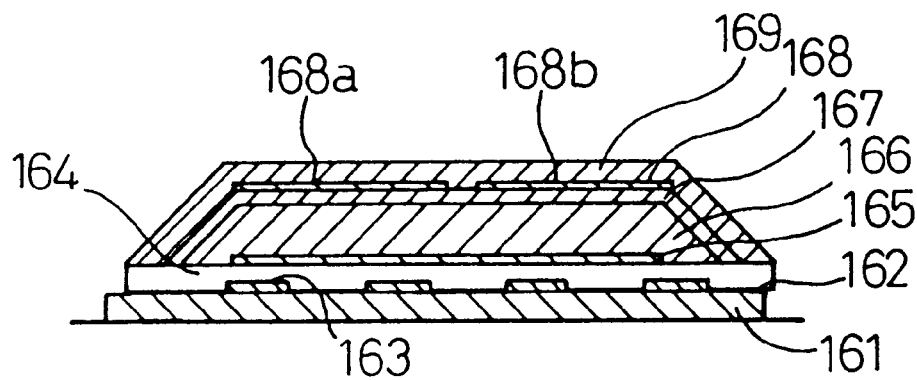
FIG. 28 is a view showing another embodiment of the drive section corresponding to FIG. 27(d), in which piezoelectric material is used.

FIG. 28 is a view showing another embodiment of the drive section in which piezoelectric material is used. In this embodiment, the piezoelectric thin film 166 is covered with the film 169 of SiO$_2$ from the outside of the electrodes 165, 168. When minute pores exist on the piezoelectric thin film 166, there is a possibility of dielectric breakdown between the upper and lower electrode 165 and 168. Therefore, like the embodiment shown in FIG. 27(*a*) or the embodiment discussed here, it is preferable to provide a dielectric breakdown preventing film 167 made of SiO$_2$, which is thinner than the piezoelectric film 166, on the upper or lower surface of the piezoelectric thin film 166 and inside of the electrodes 165 and 168.

The narrower the width of the beam of the drive section formed by the piezoelectric film 166 is, the more the displacement is increased. And, when the thickness of the thin film 166 of ZnO is small, an intensity of the electric field per supplied voltage is increased, so that the displacement is increased. However, from the viewpoint of prevention of dielectric breakdown, the maximum of the supplied voltage may be ±50 V.

Dimensions such as beam width and film thickness are related to the resonant frequency of the beam. In general, when the beam is made to be narrow or the film thickness is made to be small, the resonant frequency become low. Accordingly, the dimensions are restricted by the aforementioned displacement and the resonant frequency.

Figure 29:
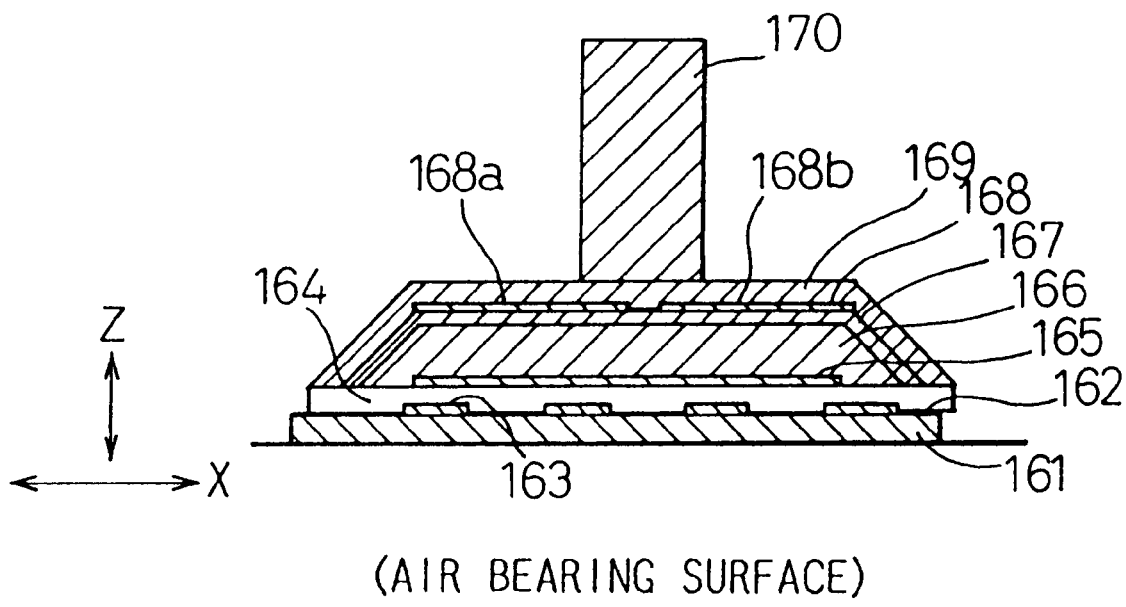
FIG. 29 is a view showing still another embodiment of the drive section corresponding to FIG. 27(d), in which piezoelectric material is used.

As a method of maintaining the stiffness of the beam in the flying direction while the displacement is maintained to be minimum, it is possible to provide a Prism-shaped support at the center of the width of the beam. Such an embodiment is shown in FIG. 29. Since the Prism-shaped support 170 is provided only at the center of the beam width, movement in the tracking direction (the direction of arrow X in FIG. 29) is relatively less blocked, although the stiffness in the floating direction (the direction of arrow Z in FIG. 29) is greatly improved.

In the drive section shown in FIGS. 27 to 29 in which the piezoelectric film is used, when voltage, the phases of which are reverse to each other, is applied upon the divided two upper electrodes 168*a* and 168*b*, respectively, can be conducted by displacing the head 124 in the tracking direction (X) by a minute distance. On the other hand, when voltages, the phases of which are the same, are impressed upon the divided upper electrodes 168*a* and 168*b*, it is also possible to move the head 124 in the flying direction (Z) by a minute distance.

Figure 30A:
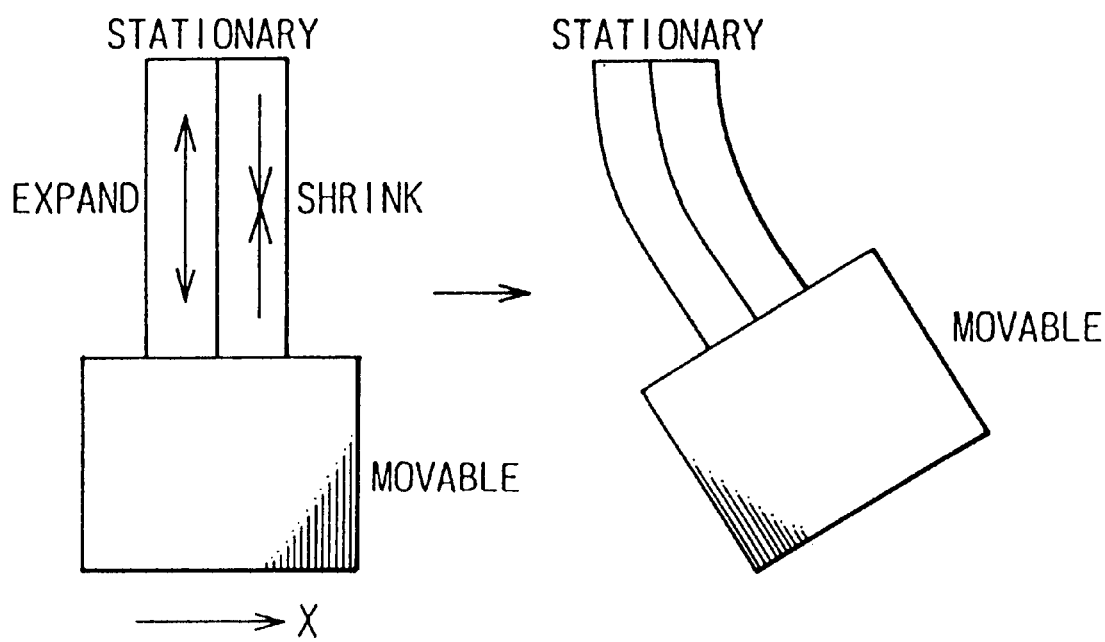
Figure 30B:
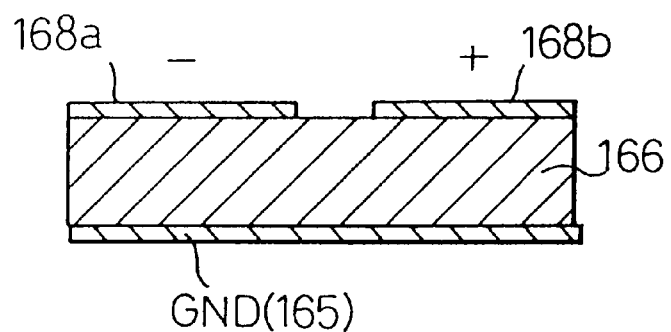

FIGS. 30(*a*) and 30(*b*) are views showing a head which has been displaced in the tracking direction (X) by a minute distance. FIGS. 31(*a*) and 31(*b*) are views showing the operation principle for displacing the head in the flying direction (Z). In the case shown in FIGS. 31(*a*) and 31(*b*), the film thickness of the upper layer 171 and the film thickness of the lower layer 172 are different, wherein the ZnO thin film 166 is interposed between the upper layer 171 and the lower layer 172. Therefore, the neutral axis does not coincide with the center of the piezoelectric film on the section containing the piezoelectric film, but the neutral axis is shifted upward. When the piezoelectric film is expanded and contracted in the above structure, the beam is bent in the direction of Z, so that a predetermined displacement of the direction of Z (the loading and unloading direction) can be provided. Even if the film thickness of the upper layer 171 and the film thickness of the lower layer 172 are the same, when the Prism-shaped support is attached as shown in FIG. 29, it is possible to provide the effect of shifting the neutral axis upward. In the actual driving operation, it is preferable to conduct both the tracking correction and the loading/unloading clearance correction. It should be noted that in FIGS. 30(*a*), 30(*b*), 31(*a*) and 31(*b*), the displacement of the beam is greatly exaggerated for the convenience of explanation.

According to the present invention, it is possible to simplify the structure of the head slider and the manufacturing process. Further, it is possible to easily incorporate the head element into the tracking mechanism or the loading/unloading mechanism. Consequently, it is possible to provide a thin film magnetic head slider of high performance and low cost. It is also possible to enhance the density of a recording medium.

What is claimed is:

1. A thin film magnetic head slider adapted to be opposed to a recording medium, thin film magnetic head slider comprising:

a slider body;

an air bearing layer defining an air bearing surface;

a thin section including a portion of said air bearing layer that solely extends away from said slider body generally parallel to said air bearing surface, said thin section having at least one stationary section and a movable section opposed to a stationary section;

said movable section formed on said thin section and said stationary section cooperatingly forming a tracking mechanism, said sections configured and disposed so that said movable section moves in a tracking direction approximately perpendicular to a moving direction of the recording medium;

at least an opposed magnetic pole of a thin film magnetic head element adapted to be opposed to the recording medium, provided in the movable section of the tracking mechanism;

at least one support spring extending from the stationary section and supporting the movable section; and a drive-force-generating section for driving the movable section with respect to the stationary section, against an elastic force of the support spring, by an electrostatic attraction force acting between the opposed surfaces of the movable and the stationary sections when a voltage is applied between the opposed surfaces.

2. A head slider as set forth in claim 1, wherein three pressure generating pads are provided on a surface of the slider body opposed to the recording medium, and the movable section is arranged inside a triangle defined by the three pressure generating pads.

3. A head slider as set forth in claim 1, wherein the stationary section further includes a plurality of teeth positioned generally parallel to each other; wherein the movable section further includes a plurality of teeth positioned generally parallel to the teeth of the stationary section; wherein said support spring supports the movable section so that the movable section can be moved with respect to the stationary section in a tooth width direction; and wherein said drive-force-generating section is configured and disposed to move the movable section to a position at which said electrostatic attraction force in the tooth width direction is balanced with said elastic force of the support spring when said voltage is applied between the teeth of the stationary section and the teeth of the movable section.

4. A head slider as set forth in claim 3, wherein the plurality of teeth of the stationary section and those of the movable section are respectively arranged at regular intervals, and the teeth of the movable section deviate from respective centers of the teeth of the stationary section under a condition that said voltage is not applied.

5. A head slider as set forth in claim 4, wherein a ratio of clearances from one tooth of the teeth of the movable section to two adjacent teeth of the teeth of the stationary section, respectively, is approximately 1.2 to 10 times.

6. A head slider as set forth in claim 3, wherein the teeth of said stationary section comprises a plurality of first teeth parallel to each other and a plurality of second teeth parallel to the first teeth, wherein the first and the second teeth are insulated from each other; and said teeth provided in the movable section are arranged in parallel between the first and the second teeth of the stationary section, and forces are generated alternatively in opposite directions to each other, or forces are generated simultaneously in opposite directions and in cooperation with each other, in the tooth width direction when said voltage is applied between the movable section and the first teeth of the stationary section and also between the movable section and the second teeth of the stationary section.

7. A head slider as set forth in claim 6, wherein the movable section is electrically grounded.

8. A head slider as set forth in claim 6, wherein said voltage is selectively applied between the movable section and the first teeth of the stationary section and between the movable section and the second teeth of the stationary section in accordance with a direction in which the movable section is to be moved.

9. A head slider as set forth in claim 6, wherein offset voltages of ½ of a maximum voltage are applied between the movable section and the first teeth of the stationary section and between the movable section and the second teeth of the stationary section, respectively, and voltages, the phases of which are reverse to each other, are added therebetween, respectively.

10. A head slider as set forth in claim 3, wherein the stationary section, the movable section and the support spring are made of the same metal.

11. A head slider as set forth in claim 10, wherein the stationary section, the movable section and the support spring are formed by filling the same metal into a negative pattern.

12. A head slider as set forth in claim 11, wherein the negative pattern is made of photosensitive resin, and metallic plating is conducted into the negative pattern made of photosensitive resin so as to form the stationary section, the movable section and the support spring.

13. A head slider as set forth in claim 10, wherein the stationary section, the movable section and the head suspension are formed by etching a uniformly formed metallic film.

14. A head slider as set forth in claim 3, wherein said teeth of said movable section comprises a plurality of first teeth parallel to each other and a plurality of second teeth parallel to the first teeth, wherein the first and the second teeth are insulated from each other; wherein said teeth of said stationary section are arranged in parallel between the first and the second teeth of the movable section, and wherein forces are generated alternatively in opposite directions to each other, or forces are generated simultaneously in opposite directions and in cooperation with each other, in the tooth width direction, when a voltage is applied between the stationary section and the first teeth of the movable section and also when a voltage is applied between the stationary section and the second teeth of the movable section.

15. A slider as set forth in claim 1, wherein a lead wire of the thin film magnetic head is provided along the support spring.

16. A head slider as set forth in claim 1, wherein a lead wire of the thin film magnetic head is drawn out from the support spring.

17. A head slider as set forth in claim 1, wherein a stopper to restrict the movement of the movable section is provided, and an electric potential of the stopper is the same as that of the movable section so that an electric short circuit between the movable and the stationary section can be prevented.

18. A head slider as set forth in claim 1, wherein at least a recording medium opposing magnetic pole of the thin film magnetic head element is exposed to a recording-medium-opposing surface of the slider film or alternatively exposed under a condition that the electrode is covered with a protective layer, and wherein the drive-force-generating section is not exposed to the recording-medium-opposing surface.

19. A head slider as set forth in claim 1, wherein a drive mechanism for driving the movable section with respect to the stationary section is composed of a piezoelectric element.

20. A head slider as set forth in claim 19, wherein the piezoelectric element is composed in such a manner that a piezoelectric film is interposed between upper and lower electrode layers so that at least one electrode layer is above said piezoelectric film and at least one electrode layer is below said piezoelectric film in a floating direction with respect to the recording medium.

21. A head slider as set forth in claim 20, wherein a piezoelectric film and an insulating film are interposed between the upper and the lower electrode layers.

22. A head slider as set forth in claim 20, wherein one of the upper and the lower electrode layers is divided into two pieces, and voltages, the phases of which are reverse to each other, are applied upon these divided electrodes.

23. A head slider as set forth in claim 20, wherein the piezoelectric film arranged between the upper and the lower electrode layers is not symmetrical with respect to an upward and downward direction.

24. A head slider as set forth in claim 20, wherein a pillar-shaped support is arranged on a back face of the piezoelectric element.

25. A head slider as set forth in claim 24, wherein the pillar-shaped support is made of metal such as Cu or Ni.

26. A head slider as set forth in claim 19, wherein the piezoelectric element is made of ZnO or PZT.

27. A head slider as set forth in claim 19, wherein the overall piezoelectric element is covered with an insulating material.

28. A thin film magnetic head slider adapted to be opposed to a recording medium comprising:
- a slider body provided on a surface of a substrate or on a surface of a sacrificial layer provided on said substrate, the substrate and the sacrificial layer being separate from the slider body, said slider body having a stationary section having a plurality of teeth positioned generally parallel to each other and a movable section having a plurality of teeth positioned generally parallel to the teeth of the stationary section;
- a tracking mechanism supported by said stationary section so that said movable section can be moved in a tracking direction approximately perpendicular to a moving direction of said recording medium;
- a thin film magnetic head element having at least one opposed magnetic pole adapted to be opposed to the recording medium and provided in the movable section of the tracking mechanism;
- at least one support spring extending from the stationary section and supporting said movable section so that the movable section can be moved with respect to the stationary section in a tooth width direction;
- a drive-force-generating section for driving the movable section with respect to the stationary section, against an elastic force of the support spring, by an electrostatic attraction force acting between the opposed surfaces of the movable and the stationary sections, said drive-force-generating section is configured and disposed to move the movable section to a position at which said electrostatic attraction force in the tooth width direction is balanced with said elastic force of the support spring when said voltage is applied between the teeth of the stationary section and the teeth of the movable section.

* * * * *